United States Patent
Gomes

(10) Patent No.: US 10,988,120 B2
(45) Date of Patent: *Apr. 27, 2021

(54) COLLISION AVOIDANCE BRAKING SYSTEM AND METHOD

(71) Applicant: Arnaldo C. Gomes, Warren, NJ (US)

(72) Inventor: Arnaldo C. Gomes, Warren, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/806,125

(22) Filed: Mar. 2, 2020

(65) Prior Publication Data
US 2020/0198601 A1    Jun. 25, 2020

Related U.S. Application Data

(63) Continuation of application No. 16/373,578, filed on Apr. 2, 2019, now Pat. No. 10,576,946, which is a continuation-in-part of application No. 16/188,175, filed on Nov. 12, 2018, now Pat. No. 10,676,073, which is a continuation of application No. 15/439,261, filed on Feb. 22, 2017, now Pat. No. 10,124,777.

(51) Int. Cl.
| | |
|---|---|
| *B60T 7/22* | (2006.01) |
| *B60T 8/26* | (2006.01) |
| *B60T 13/26* | (2006.01) |
| *B60T 13/66* | (2006.01) |
| *B60T 13/68* | (2006.01) |
| *B60T 17/22* | (2006.01) |
| *B60T 8/36* | (2006.01) |

(52) U.S. Cl.
CPC ............... *B60T 7/22* (2013.01); *B60T 8/263* (2013.01); *B60T 8/266* (2013.01); *B60T 13/268* (2013.01); *B60T 13/662* (2013.01); *B60T 13/683* (2013.01); *B60T 17/22* (2013.01); *B60T 8/3605* (2013.01); *B60T 2201/022* (2013.01)

(58) Field of Classification Search
CPC ...... B60T 8/263; B60T 8/4818; B60T 8/1708; B60T 7/22; B60T 2201/022; B60T 13/683
See application file for complete search history.

(56) References Cited

U.S. PATENT DOCUMENTS

| | | |
|---|---|---|
| 2,062,500 A | 12/1936 | Casler et al. |
| 3,903,919 A | 9/1975 | Zeuner |

(Continued)

OTHER PUBLICATIONS

International Search Report and Written Opinon of the International Searching Authority for PCT/US2020/025650.

*Primary Examiner* — Bradley T King
(74) *Attorney, Agent, or Firm* — Roberts & Roberts, LLP; Richard S. Roberts, Jr.

(57) ABSTRACT

An automatic braking system and method are provided for controlling the automatic operation of a pneumatic (air) brake system installed on commercial highway vehicles and the like, particular heavy trucks and buses. When a possible collision is detected or an object is detected in proximity to at least one side and/or end of the vehicle, the system automatically operates the existing, factory installed air braking system of the vehicle to avoid a collision or mitigate the collision impact by concurrently pressurizing each of the rear and front pneumatic service brakes of the vehicle. Pressing the existing vehicle brake pedal deactivates the automatic braking system, thereby permitting the driver to take over control of braking at any time.

23 Claims, 15 Drawing Sheets

(56) References Cited

U.S. PATENT DOCUMENTS

| | | |
|---|---|---|
| 4,118,076 A | 10/1978 | Mild |
| 4,146,107 A | 3/1979 | Ebbeson et al. |
| 4,261,624 A | 4/1981 | Plantan |
| 4,455,052 A | 6/1984 | Bueler |
| 4,556,259 A | 12/1985 | Feldmann et al. |
| 4,776,648 A | 10/1988 | Newton et al. |
| 4,973,107 A | 11/1990 | Graham |
| 5,458,402 A | 10/1995 | Jeffery |
| 5,931,547 A | 8/1999 | Lerner |
| 6,056,374 A | 5/2000 | Hiwatashi |
| 6,183,052 B1 | 2/2001 | Harada et al. |
| 6,272,904 B1 | 8/2001 | Neely, Jr. et al. |
| 6,342,832 B1 | 1/2002 | Fuchs et al. |
| 6,523,912 B1 | 2/2003 | Bond, III et al. |
| 6,984,005 B2 | 1/2006 | Meyer et al. |
| 7,018,004 B2 | 3/2006 | Chen et al. |
| 7,103,464 B2 | 9/2006 | Zielke |
| 7,209,050 B2 | 4/2007 | Corcoran, III |
| 8,631,913 B2 | 1/2014 | Besler |
| 8,702,179 B2 | 4/2014 | Beier et al. |
| 8,739,938 B2 | 6/2014 | King et al. |
| 8,794,715 B2 | 8/2014 | Bennett et al. |
| 8,823,504 B2 | 9/2014 | Custer et al. |
| 8,833,868 B2 | 9/2014 | Bensch et al. |
| 8,851,580 B2 | 10/2014 | Herbst |
| 8,979,217 B2 | 3/2015 | Steinberger et al. |
| 8,991,536 B2 | 3/2015 | Dieckmann et al. |
| 9,428,163 B2 | 8/2016 | Breuer et al. |
| 9,511,741 B1 | 12/2016 | Wu |
| 9,771,055 B1 | 9/2017 | Zhang et al. |
| 10,131,336 B2 | 11/2018 | Niglas et al. |
| 10,576,946 B2 * | 3/2020 | Gomes .............. B60T 8/266 |
| 10,676,073 B2 * | 6/2020 | Gomes .............. B60T 13/268 |
| 10,737,667 B2 * | 8/2020 | D'sa .............. B60T 13/74 |
| 2003/0043033 A1 | 3/2003 | Lee |
| 2003/0205928 A1 | 11/2003 | Harris et al. |
| 2004/0019426 A1 | 1/2004 | Knoop et al. |
| 2004/0193351 A1 | 9/2004 | Takahashi et al. |
| 2005/0168064 A1 | 8/2005 | McCann |
| 2006/0152075 A1 | 7/2006 | Goebels et al. |
| 2008/0234907 A1 | 9/2008 | Labuhn et al. |
| 2009/0018740 A1 | 1/2009 | Noda et al. |
| 2009/0224944 A1 | 9/2009 | Wan |
| 2010/0056338 A1 | 3/2010 | Erban |
| 2013/0158801 A1 | 6/2013 | Tober et al. |
| 2013/0320751 A1 | 12/2013 | Eberling et al. |
| 2015/0210280 A1 | 7/2015 | Agnew et al. |
| 2015/0360655 A1 | 12/2015 | Odate et al. |
| 2016/0137177 A1 | 5/2016 | Ulf et al. |
| 2016/0311413 A1 | 10/2016 | Odate |
| 2017/0267222 A1 | 9/2017 | Antunes |
| 2017/0267234 A1 | 9/2017 | Kemp et al. |
| 2018/0236984 A1 | 8/2018 | Gomes |
| 2018/0354475 A1 | 12/2018 | Carritte et al. |
| 2018/0354483 A1 | 12/2018 | Hanslik et al. |
| 2018/0370507 A1 | 12/2018 | Eckert et al. |
| 2019/0071083 A1 | 3/2019 | Takahashi et al. |
| 2019/0077384 A1 | 3/2019 | Gomes |
| 2020/0108808 A1 * | 4/2020 | Zhou .............. B60T 7/22 |

* cited by examiner

COLLISION AVOIDANCE BRAKING SYSTEM AND METHOD

CROSS-REFERENCE TO RELATED APPLICATIONS

This application is a Continuation of co-pending U.S. application Ser. No. 16/373,578 filed Apr. 2, 2019, now U.S. Pat. No. 10,576,946, which issued on Mar. 3, 2020, which is a Continuation-in-Part of co-pending U.S. application Ser. No. 16/188,175, filed Nov. 12, 2018, now U.S. Pat. No. 10,676,073, which issued on Jun. 9, 2020, which is a Continuation of U.S. application Ser. No. 15/439,261, filed Feb. 22, 2017, now U.S. Pat. No. 10,124,777, which issued on Nov. 13, 2018, the disclosures of which are incorporated by reference herein in their entireties.

BACKGROUND

Technical Field

This technology relates to an automatic braking system for vehicles equipped with pneumatic, air braking systems, particularly heavy duty vehicles, to aid in avoiding collisions with objects and other vehicles.

Description of the Related Art

Collision avoidance systems are object detection and ranging systems that use radar, laser, optical camera ranging technology, and the like to trigger an alarm to the driver or to activate automatic braking assistance that either adjusts the speed of automatic cruise control or activates automated braking of the vehicle. Generally, these systems serve to reduce or eliminate the effect of human reaction time when braking in the presence of a collision threat. The concept of braking assistance in passenger vehicles (e.g., cars and light trucks) goes back more than 20 years. In 1996, Mercedes-Benz introduced its Brake Assist System (BAS) which uses sensors to detect a situation in front of a car in which an accident is considered imminent. The system acts as a supplement to the pressing of the driver brake pedal, interpreting the speed and force with which the brake pedal is pushed and boosting the braking effect if it is pressed too gently in a critical situation. Similarly, car makers such as Ford, Honda, Mazda, Mitsubishi, Nissan, Toyota and Volvo have also developed their own automatic braking technologies. For example, in 2003, Honda introduced its Collision Mitigation Brake System which was a system that warned a driver of an impending collision with audio and tactile warnings to prompt preventive action, and similar to the Mercedes-Benz BAS, regulated pressure on the brakes to reduce vehicle speed when the driver applied pedal pressure was computed as insufficient to stop the car before a collision occurred. In 2006, Volvo introduced its own version of collision warning system with brake support, providing driver warnings and pre-charging vehicle brakes and automatically activating them if a driver does not apply the brake quickly enough when a collision is calculated as being imminent. Other automatic braking control solutions are taught in U.S. Pat. No. 5,278,764 to Nissan Motor Company, Ltd.; U.S. Pat. No. 5,420,792 to Mazda Motor Corp.; U.S. Pat. No. 6,017,102 to Toyota Motor Corp.; U.S. Pat. No. 6,131,063 assigned to Mitsubishi Electric Corp.; and U.S. Pat. No. 6,523,912 to Ford Global Technologies, Inc. In a more recent example, U.S. Pat. No. 9,771,055 to Zhang teaches an electronic impact mitigation system that uses an electronic sensing control system in conjunction with an automated (or semi-automated) braking system to detect the potential of collision with obstacles in both the front and the rear of a vehicle, electronically adjusting deceleration during braking to avoid a rear collision as well as a front collision.

Over the past several years, new studies have shown the impact of even small driver distractions on slow reaction times and the ability to safely avoid collisions, particularly when driving at high speeds. In fact, the U.S. National Highway Traffic Safety Administration (NHTSA) has attributed at least 10% of vehicle fatalities to distracted driving. Accordingly, today most car makers have adopted at least some form of collision warning and auto braking technologies, with substantial investments in research and development continuously ongoing.

With the obvious benefits, automatic braking technology in passenger vehicles is transitioning from a luxury option in high end vehicle models to now trending toward becoming a required standard feature in all passenger vehicles. In this regard, the National Highway Traffic Safety Administration (NHTSA) and the Insurance Institute for Highway Safety announced in March 2016 that by the year 2022 approximately 99% of new automobiles must have automatic emergency braking systems as a standard feature. However, in order to maximize traffic safety, improvements in collision avoidance cannot be limited to simply accounting for driver behavior in passenger vehicles, but must account for all vehicles and obstacles on the road that could cause or be involved in accidents and collisions. This includes heavy commercial or public use vehicles, such as heavy straight trucks, tractor trailers and buses, which generally have a maximum gross vehicle weight rating (GVWR) of 20,000 pounds or more. Such heavy vehicles conventionally have pneumatic (air) braking systems that are substantially different than the hydraulic braking systems of lighter passenger vehicles. In a hydraulic brake system, brake fluid is used to transmit hydraulic pressure from the car brake pedal to the front and rear brakes, and braking force is dependent to a large measure upon the pressure exerted by pressing the brake pedal. Air brakes function without brake fluid, using air pressure to operate the front and rear brakes of the vehicle. Air brakes are most suitable for heavy vehicles because they can generate a greater stopping force than hydraulic brakes, use simpler components, remain operable even in the presence of a leak, and are generally safer than hydraulic brakes. However, these pneumatic braking systems are incompatible with the known auto braking solutions designed for hydraulic braking systems. This is because air brake system components and hydraulic brake system components differ remarkably and therefore pneumatic collision avoidance systems require entirely different technology than hydraulic collision avoidance systems. Unfortunately, investments in research and development for this industry have not matched that of passenger vehicles, and thus there is a significant need in this art.

In recognition of this need, a substantial advance in the art has recently been developed and is described in U.S. pre-grant publication 2018/0236984 to inventor Arnaldo C. Gomes, the inventor of the present patent application, which is soon to be granted. That invention provides a method of automatic braking for vehicle air brake systems where rear and front brakes are treated differently, with the rear brakes always being pressurized and physically engaged prior to the front brakes, and with the braking air pressure being controlled so that the rear pressure is always higher than the front pressure. That system is a monumental achievement in the art of automatic braking for heavy, pneumatic braking vehicles. However, there is also a desire in the art for a simplified automatic braking system that does not require all the structural features that are necessary when the front and rear brakes are handed differently, and particularly an automatic braking system that does not function in a manner wherein the pressurization of the front brakes are managed in relation to the pressurization of the rear brakes. More specifically, there is a need in the art for a simplified automatic braking system for vehicle pneumatic braking systems where the front and rear brakes are pressurized without requiring the rear brakes to first reach a threshold pressure level, while also allowing the driver of the vehicle to control vehicle braking independent of the automatic braking system at all times by simply pressing the vehicle brake pedal. It is also desired that the automatic braking system is suitable for aftermarket installation in older vehicles already in use, as well as being capable of operating with a variety of third party warning or detection devices rather than requiring proprietary vehicle manufacturer installed detection technology. The present disclosure provides a solution to this need.

SUMMARY OF THE DISCLOSURE

Automatic braking control systems and methods of automatic braking are provided for controlling the automatic operation of a pneumatic (air) brake system installed on commercial highway vehicles and the like, particularly heavy trucks and buses. When a possible collision is detected or an object is detected in close proximity to at least one side and/or end of the vehicle, the system automatically operates the existing, factory installed air braking system of the vehicle to avoid a collision or mitigate the collision impact by concurrently pressurizing both the rear brake assemblies/units and front brake assemblies (rear and front service brakes) of the vehicle. The automatic braking system is pneumatically operated and controlled, while still permitting the normal physical operation of the air brakes by pressing the driver brake pedal. The system is compatible with any vehicle having a new or old factory installed air brake system that is either already equipped with or upgraded to include a commercial collision warning device having sensors and/or signal transmitters/receivers mounted at least on the front of the vehicle and/or object detection sensors mounted on at least one side and/or end of the vehicle, or other appropriate ranging technology. Therefore, the automatic braking, collision avoidance system of this disclosure may be installed on any such vehicle either as original equipment or as an after-market upgrade of the factory installed air brake system.

Particularly provided is an automatic braking system for a vehicle having pneumatic brakes and a vehicle brake pedal (21), the system comprising:
a) an actuation apparatus comprising at least one solenoid operated pneumatic valve, wherein the solenoid operated pneumatic valve comprises a solenoid, wherein said valve opens and remains open when the solenoid is energized, and closes and/or remains closed when the solenoid is not energized;
b) a collision warning device (11) directly or indirectly electrically connected to said at least one solenoid operated pneumatic valve, wherein the collision warning device (11) continuously monitors the presence of obstacles in front of the vehicle and continuously calculates a closure time of the vehicle with a detected obstacle, wherein said collision warning device (11) causes the solenoid of said at least one solenoid operated pneumatic valve to be energized when said closure time is at or below a pre-set time to collision value and causes each solenoid to remain energized until said closure time is above said pre-set time to collision value or until the vehicle brake pedal (21) is pressed;
c) a first air pressure reservoir (45) pneumatically connected to said at least one solenoid operated pneumatic valve;
d) front pneumatic brakes pneumatically connected to said at least one solenoid operated pneumatic valve, said front pneumatic brakes comprising a left front brake assembly (41) and a right front brake assembly (43); and
e) rear pneumatic brakes pneumatically connected to said at least one solenoid operated pneumatic valve, said rear pneumatic brakes comprising a left rear pneumatic brake unit (59) and a right rear pneumatic brake unit (61), wherein each pneumatic brake unit comprises at least one pneumatic brake assembly;
wherein opening the at least one solenoid operated pneumatic valve activates automatic braking, wherein when the at least one solenoid operated pneumatic valve is open, air flows from the first air pressure reservoir (45) through the at least one solenoid operated pneumatic valve and then concurrently flows to all of the front pneumatic brake assemblies and rear pneumatic brake assemblies, thereby concurrently engaging the front pneumatic brake assemblies ((41) and (43)) and engaging pneumatic brake assemblies of the rear pneumatic brake units ((59) and (61)), and wherein pressing the vehicle brake pedal (21) causes the solenoid of each open solenoid operated pneumatic valve to de-energize, thereby causing all of said open solenoid operated pneumatic valves to close, and thereby deactivating automatic braking.

Also provided is an automatic braking system for a vehicle having pneumatic brakes and a vehicle brake pedal (21), the system comprising:
a) an actuation apparatus comprising at least one solenoid operated pneumatic valve, wherein the solenoid operated pneumatic valve comprises a solenoid, wherein said valve opens and remains open when the solenoid is energized, and closes and/or remains closed when the solenoid is not energized;
b) one or more collision warning devices (11'), each collision warning device (11') being directly or indirectly electrically connected to the solenoid operated pneumatic valve, and each collision warning device (11') comprising one or more sensors that continuously monitor for the presence of obstacles in proximity of at least one side and/or end of the vehicle, wherein each collision warning device (11') causes the solenoid of said solenoid operated pneumatic valve to be energized when an obstacle is detected in proximity of at least one side and/or end of the vehicle and causes the solenoid to remain energized until said obstacle is no longer detected or until the vehicle brake pedal (21) is pressed;
c) a first air pressure reservoir (45) pneumatically connected to said solenoid operated pneumatic valve;
d) front pneumatic brakes pneumatically connected to the solenoid operated pneumatic valve, said front pneumatic brakes comprising a left front brake assembly (41) and a right front brake assembly (43); and
e) rear pneumatic brakes pneumatically connected to the solenoid operated pneumatic valve, said rear pneumatic brakes comprising a left rear pneumatic brake unit (59) and a right rear pneumatic brake unit (61), wherein each pneumatic brake unit comprises at least one pneumatic brake assembly;
wherein opening the solenoid operated pneumatic valve activates automatic braking, wherein when the solenoid operated pneumatic valve is open, air flows from the first air pressure reservoir (45) through the solenoid operated pneumatic valve and then concurrently flows to each of the rear pneumatic brake assemblies and optionally to each of the front pneumatic brake assemblies, thereby engaging the pneumatic brake assemblies of the rear pneumatic brake units ((59) and (61)) and optionally engaging the front pneumatic brake assemblies ((41) and (43)) concurrently with the rear pneumatic brake assemblies, and wherein pressing the vehicle brake pedal (21) causes the solenoid of each open solenoid operated pneumatic valve to de-energize, thereby causing all of said open solenoid operated pneumatic valves to close, and thereby deactivating automatic braking.

Further provided is an automatic braking system for a vehicle having pneumatic brakes, which vehicle has a vehicle brake pedal (21) and a plurality of wheels, each of said wheels being connected to a brake assembly and each of said wheels having a wheel sensor connected to the brake assembly of said wheel, the system comprising:

a) an actuation apparatus (13') comprising a plurality of solenoid operated pneumatic valves, wherein each solenoid operated pneumatic valve comprises a solenoid and wherein each solenoid operated pneumatic valve opens and remains open when its solenoid is energized and closes and/or remains closed when its solenoid is not energized, wherein each solenoid operated pneumatic valve is pneumatically paired with one of said anti-lock braking system control modules;

b) a collision warning device (11) directly or indirectly electrically connected said solenoid operated pneumatic valves of the actuation apparatus, wherein the collision warning device (11) continuously monitors the presence of obstacles in front of the vehicle and continuously calculates a closure time of the vehicle with a detected obstacle, wherein said collision warning device causes the concurrent energizing of the solenoid of each solenoid operated pneumatic valve when said closure time is at or below a pre-set time to collision value, and causes each solenoid to remain independently energized unless i) or ii) or iii):

i) said closure time increases to a value above said pre-set time to collision value, thereby de-energizing all of the solenoids of all of the solenoid operated pneumatic valves, thereby causing all of the solenoid operated pneumatic valves to concurrently close, thereby deactivating all automatic braking; or ii) at least one of said wheel sensors detects that the brake assembly it is connected to has locked, thereby de-energizing the solenoid of the solenoid operated pneumatic valve that is connected to the locked brake assembly independently of the other wheels, thereby closing the solenoid operated pneumatic valve connected to the locked brake assembly, thereby deactivating automatic braking for the locked brake assembly; or iii) the vehicle brake pedal (21) is pressed;

c) a first air pressure reservoir (45) pneumatically connected to each solenoid operated pneumatic valve; and wherein opening the solenoid operated pneumatic valves activates automatic braking, wherein when the solenoid operated pneumatic valves are open, air flows from the first air pressure reservoir (45) concurrently through each solenoid operated pneumatic valve and then concurrently flows toward all brake assemblies, thereby causing the concurrent engaging of all of said brake assemblies, and wherein pressing the vehicle brake pedal (21) causes the solenoid of each open solenoid operated pneumatic valve to concurrently de-energize, thereby causing each of said open solenoid operated pneumatic valves to concurrently close, and thereby deactivating all automatic braking.

Still further provided is a method of automatic braking of a moving vehicle that has pneumatic brakes and a vehicle brake pedal (21), the method comprising the steps of:

a) monitoring for the presence of obstacles that are either:
    (i) in proximity of at least one side and/or end of the vehicle; or
    (ii) within a pre-set time to collision value in front of the vehicle;

b) activating automatic braking when an object is either:
    (i) detected in proximity of at least one side and/or end of the vehicle; or
    (ii) detected within said pre-set time to collision value in front of the vehicle;

wherein automatic braking is activated by energizing at least one solenoid operated pneumatic valve which opens said energized solenoid operated pneumatic valve and initiates flow of air from an air pressure reservoir through said open solenoid operated pneumatic valve, wherein said air then flows concurrently to each of a front left pneumatic brake assembly (41), a front right pneumatic brake assembly (43), to rear left brake assemblies that form a rear left pneumatic brake unit (59) and to rear right brake assemblies that form a pneumatic brake unit (61), thereby causing the concurrent engaging of all of said brakes assemblies; and wherein pressing the vehicle brake pedal (21) causes the solenoid of each open solenoid operated pneumatic valve to de-energize, thereby causing all of said open solenoid operated pneumatic valves to close, and thereby deactivating automatic braking.

DETAILED DESCRIPTION

The four primary versions of the automatic braking collision avoidance system of this disclosure, illustrated in FIGS. 1-4, are identified herein as:

I. Single-Stage Braking Forward Collision Avoidance System Without Individual Brake Control (FIG. 1)
II. 360° Collision Avoidance System (FIG. 1 or FIG. 2)
III. Single-Stage Braking Forward Collision Avoidance System with Individual Brake Control (FIG. 3)
IV. Multi-Stage Braking Forward Collision Avoidance System Without Individual Brake Control (FIG. 4)

All of these systems have two primary components: (a) an actuation apparatus (13/13'/13"); and (b) a collision warning device (11/11').

Figure 1:
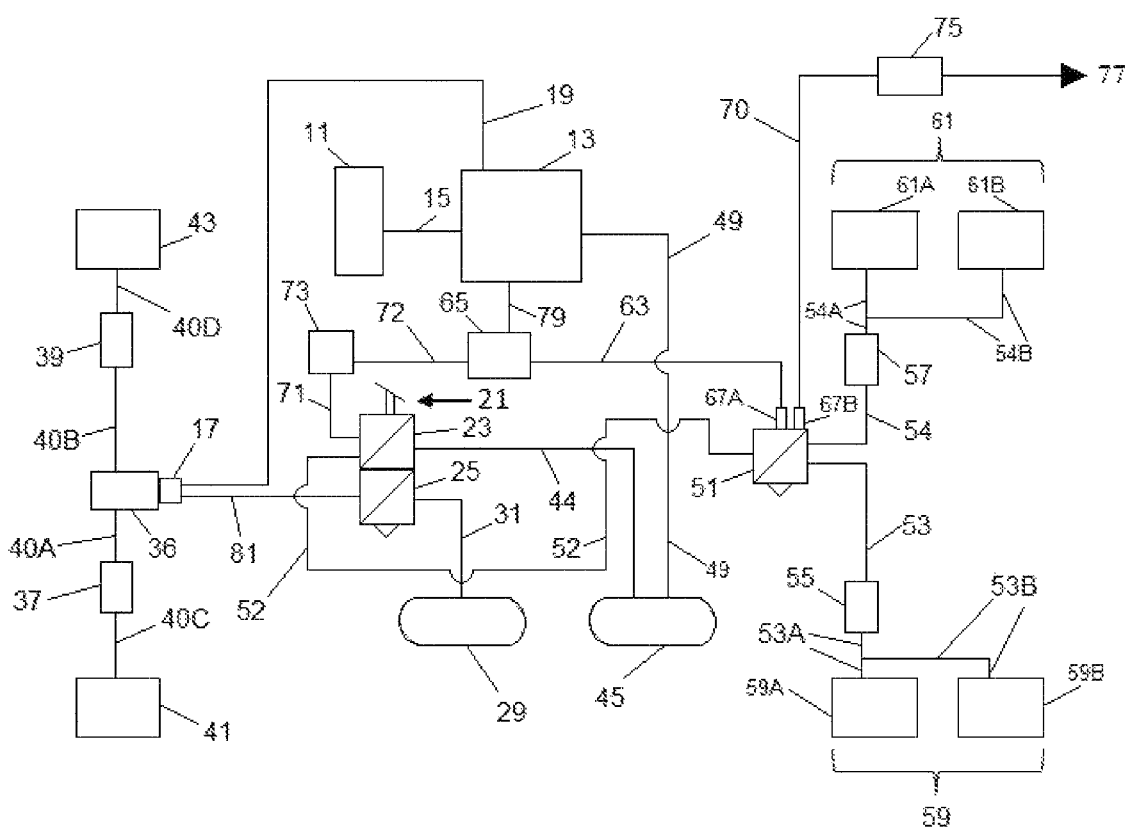
FIG. 1 is a block diagram illustrating a forward collision avoidance automatic braking system that controls the concurrent automatic braking of the front and rear brakes.
Figure 2:
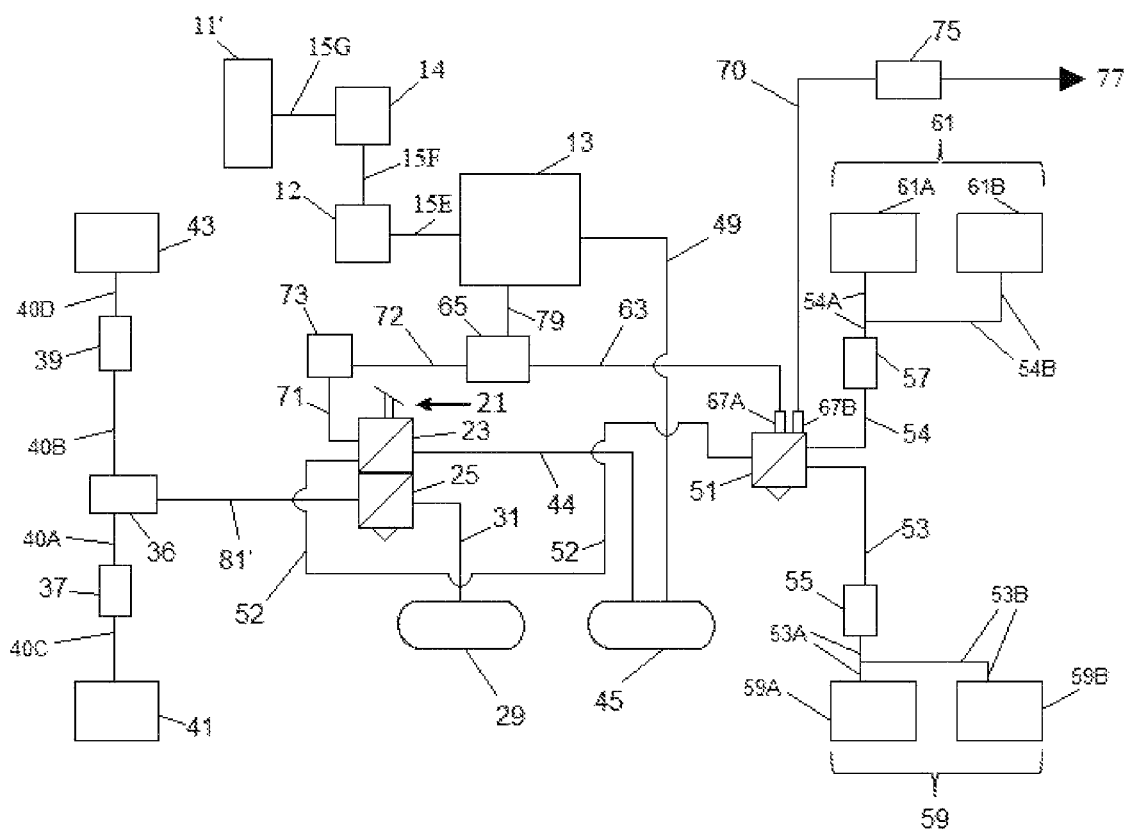
FIG. 2 is a block diagram illustrating an automatic braking system for a 360° collision avoidance system only that optionally pressurizes only the rear brakes.
Figure 4:
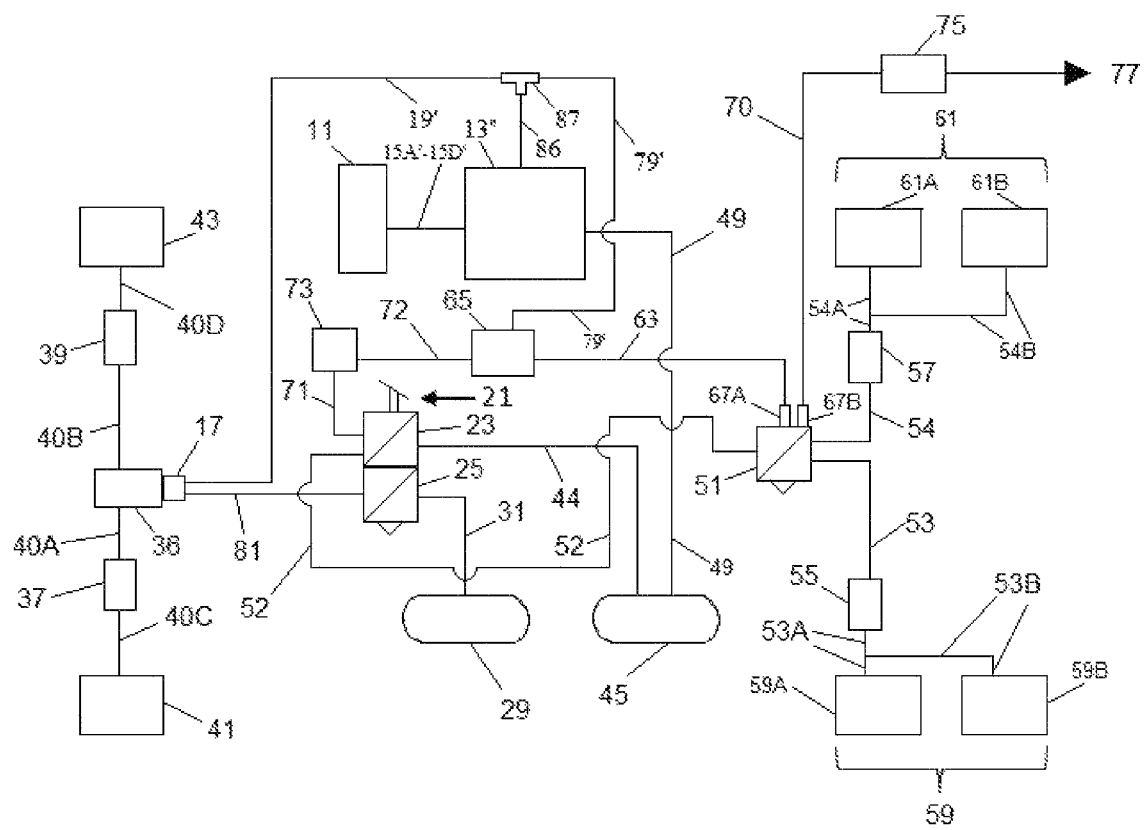
FIG. 4 is a block diagram illustrating a forward collision avoidance automatic braking system with a multi-stage actuation apparatus.

In the embodiments of FIGS. 1 and 2, the actuation apparatus (13) comprises a single, normally closed, solenoid operated pneumatic valve (valve "AA", as illustrated in FIG. 4), also referred to herein simply as a "solenoid valve", which effectuates the concurrent flow of air to the front and rear service brake assemblies/brake units during active automatic braking when it is open and also effectuates the concurrent cut off of air flow to the front and rear service brake assemblies/brake units when automatic braking is deactivated, said opening and closing of the valve being controlled through the collision warning device (11/11'). This opening and closing of the solenoid valve does not impede the flow of air to the front or rear brake assemblies/units that results from pressing brake pedal (21), as pedal braking takes priority over the automatic braking in all standard systems of this disclosure, unless that feature is intentionally overridden.

Figure 3:
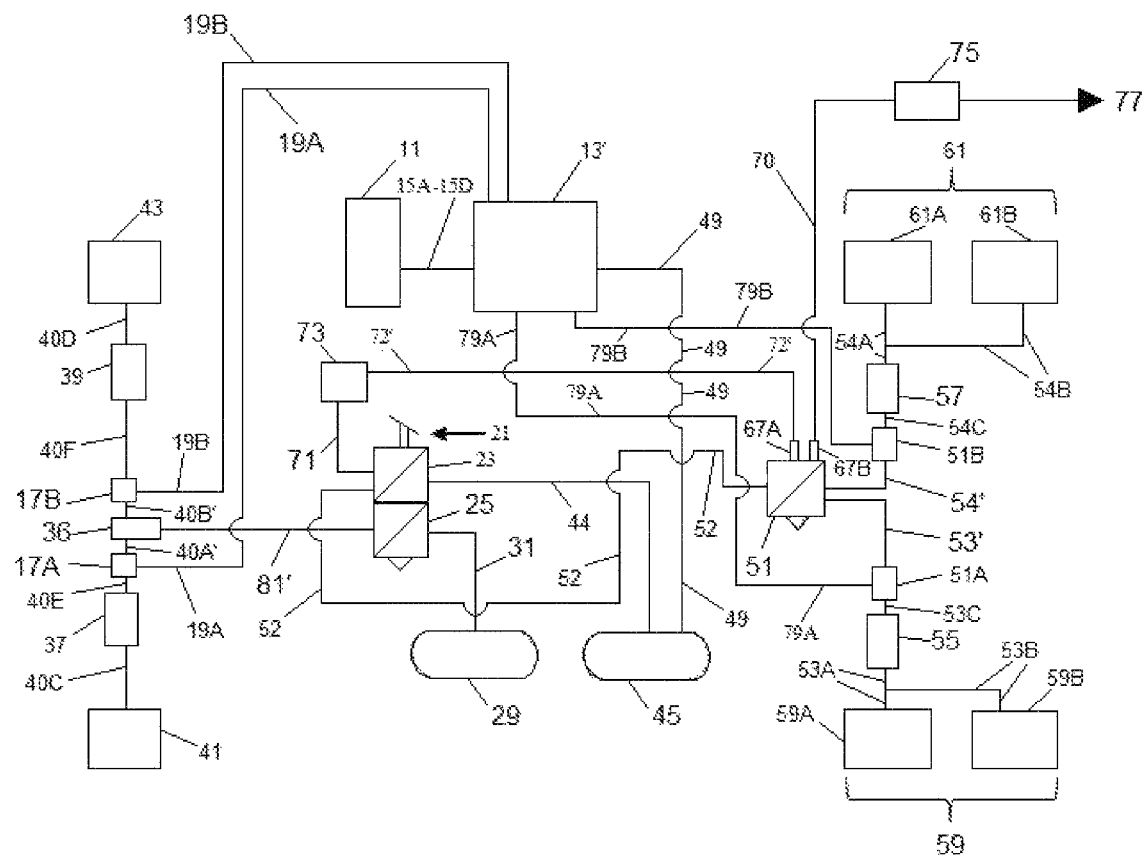
FIG. 3 is a block diagram illustrating a forward collision avoidance automatic braking system with individual brake/brake unit braking control.
Figure 6:
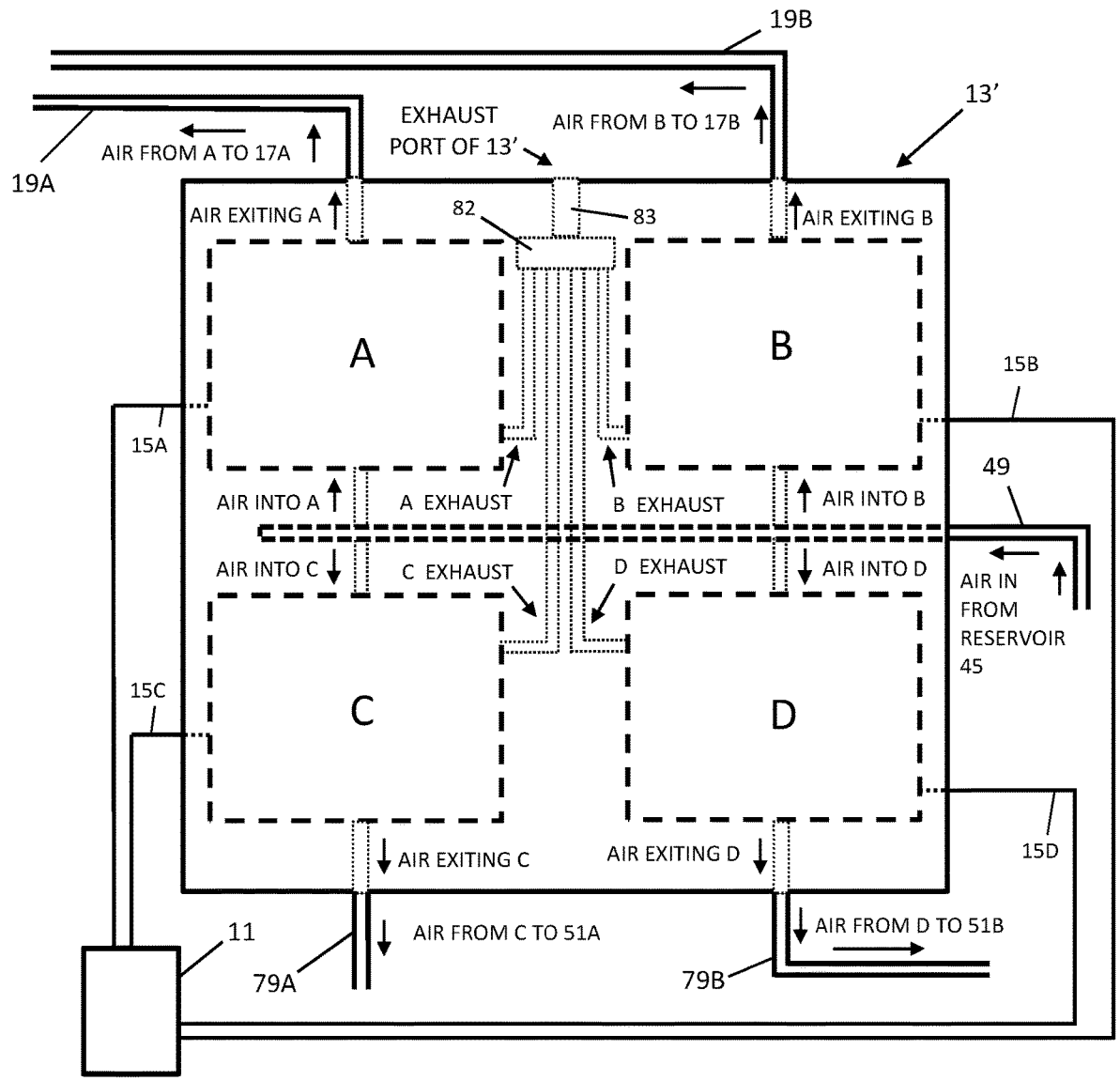
FIG. 6 is a schematic illustration of an actuation apparatus including four solenoid operated pneumatic valves for individual brake/brake unit control.

In the embodiment of FIG. 3, the actuation apparatus (13') comprises a plurality of normally closed, solenoid operated pneumatic valves (A, B, C and D, as illustrated in FIG. 6), each of which effectuates the flow of air to a single one of the front and rear service brake assemblies/brake units individually and each of which effectuates the cut off of air flow to a single one of the front (service) brake assemblies and rear (service) brake units individually, as discussed in greater detail below, resulting from the activation and deactivation of automatic braking as controlled through the collision warning device (11/11'). In this embodiment, automatic braking is effectuated in a single-stage with all of the solenoid valves being energized by the collision warning device (11/11') in unison, and thus opened in unison. However, this embodiment allows for one (or more) of the solenoid valves to be closed while the others remain open. More specifically, the individual solenoid valves of (13') allow for individual deactivation of automatic braking at each corner of the vehicle (i.e., all of the front brake assemblies (41) and (43) and the brake assemblies of the rear brake units (59) and (61)) individually and independently. In this embodiment, the initial activation of automatic braking for all of the brake assemblies is still in unison, just as in the embodiments of FIGS. 1, 2 and 4, but reactivation of automatic braking of an individual brake assembly/unit that has been deactivated is performed individually since automatic braking of the other brake assemblies has not been affected and is still ongoing, as discussed in greater detail below.

Figure 7:
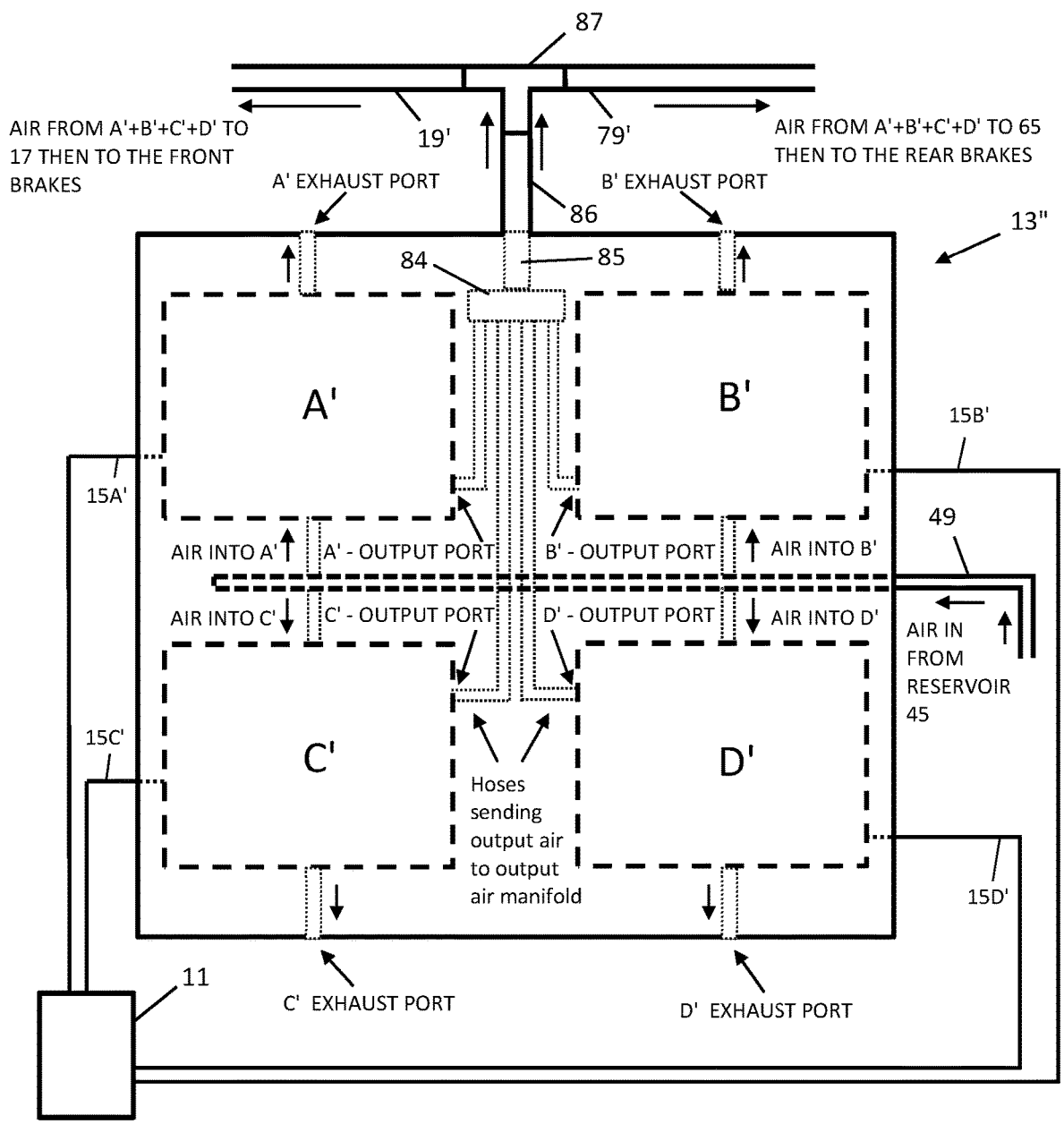
FIG. 7 is a schematic illustration of an actuation apparatus including four solenoid operated pneumatic valves for multi-stage braking without individual brake/brake unit control.

In the embodiment of FIG. 4, the actuation apparatus (13") also comprises a plurality of normally closed, solenoid operated pneumatic valves (A', B', C' and D', as illustrated in FIG. 7), and the activation of automatic braking still pressurizes all of the front and rear brake assemblies in unison with each other like the embodiments of FIGS. 1-3, but this system is not set up for individual brake deactivation. Rather, actuation apparatus (13") allows for multi-stage braking depending on the imminence of a collision as determined by the closure time calculation by the collision warning device (11), discussed in greater detail below. The four solenoid valves do not open in unison (concurrently), but air is sent to all brakes of the vehicle in unison (concurrently) with the four solenoid valves opening up sequentially as needed, with solenoid valve A' opening first, solenoid valve B' opening second (if needed), solenoid valve C' opening third (if needed), and solenoid valve D' opening fourth (if needed), with each successive valve providing a greater quantity of air flow to the brakes for greater braking force (greater air pressure on the brake assembles). The actuation apparatus (13") may also be equipped to integrate more than four solenoid valves, or alternately only two or three, if desired. Each successive solenoid valve (A'→B'→C'→D') has a lager air output port than the previous valve in the series, thereby allowing for increasing amounts of air flow as the calculated closure time decreases and the threat of collision increases. A longer calculated closure time will require lower braking force than a shorter calculated closure time, and vice/versa, so sending only the amount of air to the brake assemblies that is needed to stop or slow the vehicle will yield smoother braking.

Solenoid valves are conventionally known and as commercially available are either in a "normally closed" state or a "normally open" state. All of solenoid valves AA, A, B, C, D, A', B', C' and D' of this disclosure are normally closed valves. Normally closed solenoid valves are valves that open with the energizing of a solenoid coil within the valve body and close with the de-energizing of the same solenoid coil. When the solenoid coil is energized, energy traveling through the coil creates a magnetic flux that causes an internal stopper (such as a piston or plunger) to move and cause the valve to open to allow air to flow through and exit the valve, and also causes the stopper to reverse and close when the coil is de-energized/de-magnetized, thereby stopping air from flowing through and leaving the valve.

In each embodiment, the solenoid operated pneumatic valve(s) is (are) electrically connected with wires (15, 15A, 15B, 15C, 15D, 15A', 15B', 15C', 15D', 15E/15F/15G) to the collision warning device(s) (11/11'), either directly or indirectly (see below for direct electrical connections) and it is the collision warning device (11/11') that triggers the energizing or de-energizing of the solenoid coil in the solenoid valve(s) to which they are electrically connected based on the detection of an obstacle that may collide with the vehicle. With particular regard to the 360° Collision Avoidance embodiment of FIG. 2, the collision warning device(s) (11') is/are electrically connected to the solenoid valve(s) of the actuation apparatus indirectly, with a speed interface (or relay switch) and relay being directly electrically connected to each other as intermediate components as illustrated, with the relay (12) being directly electrically connected to the solenoid valves within the actuation apparatus via wire(s) (15E), with the relay (12) being electrically connected to an interface/relay switch (14) via wire (15F), and with the interface/relay switch (14) being electrically connected to the collision warning devices (11') via wire (15G), as described in greater detail below. The collision warning device(s) is(are) powered by the car battery, receiving voltage through the interface/relay switch (14) which is electrically connected to the vehicle ignition (or other vehicle power source) or by its own connection to the vehicle ignition (or other vehicle power source), and the electrical signal sent to the solenoid operated pneumatic valve(s) to energize the solenoid of each valve is generated using this power from the car battery.

As illustrated in FIG. 6, each solenoid valve A, B, C and D is preferably directly electrically connected to the collision warning device (11) individually with wires (15A, 15B, 15C and 15D). As illustrated in FIG. 7, each solenoid valve A', B', C' and D' is preferably directly electrically connected to the collision warning device (11) individually with wires (15A', 15B', 15C' and 15D'). However, alternative wiring configurations may be appropriate as would be determined by one skilled in the art. Further, while each "wire" (15, 15A, 15B, 15C, 15D, 15A', 15B', 15C', 15D', 15E/15F/15G) is referenced herein in the singular, a "wire" may also be representative of an electrical connection such as a cord having more than one wire if necessary to form a proper electrical circuit as determined by one skilled in the art. In this regard, any references to a component being "wired" refers to a proper electrical connection being established with all components being incorporated in the electrical circuit as needed for proper electrical circuitry, as would be readily determined by one skilled in the art.

Useful solenoid valves include two position (i.e., an open position and a closed position) valves that allow air to move in at least three directions, i.e., at least a 2-position "three-way" solenoid valve. Three-way solenoid valves allow air to move in three directions, i.e., an air input, an air output and an exhaust port. Four-way solenoid valves allow air to move in four directions, etc., as is conventionally known. In the context of this disclosure, each solenoid operated pneumatic valve has input/output (I/O) ports that allow air to move in at least three directions, with one direction being pressurized air moving into the solenoid valve from the first air pressure reservoir (45) as transported through pneumatic line (49) (i.e., a hose or tube for transporting air); a second direction being air leaving the solenoid valve (normally from one output port (see FIGS. 6 and 7) or from two separate output ports (see FIG. 5A)) for concurrent transport to the front pneumatic brake assemblies and to the rear pneumatic brake assemblies; and a third direction being an exhaust port that exhausts air out of the valve when the valve closes. The input port of each solenoid valve is large enough to allow the maximum available air flow (e.g., air from a 120 psi reservoir source) into the valves (e.g., preferably 3 mm or greater in diameter), and the exhaust ports are also large enough to let the exhaust air flow out quickly (e.g., preferably 3 mm or greater in diameter). However, the output air ports will vary in diameter as discussed herein to regulate air flow to the brakes as desired.

When a solenoid valve has more than one output port, the output ports together are one-way of air flow. FIG. 1, for example, illustrates an embodiment wherein air exits the solenoid valve from two output ports that allow air to concurrently exit the valve into pneumatic lines (19) and (79). These two outlet ports represent 1-way of air flow and this type of valve is still a 3-way valve because air moving out of the valve while it is active (i.e., while the solenoid is energized) is considered one direction of air movement.

Figure 5A:
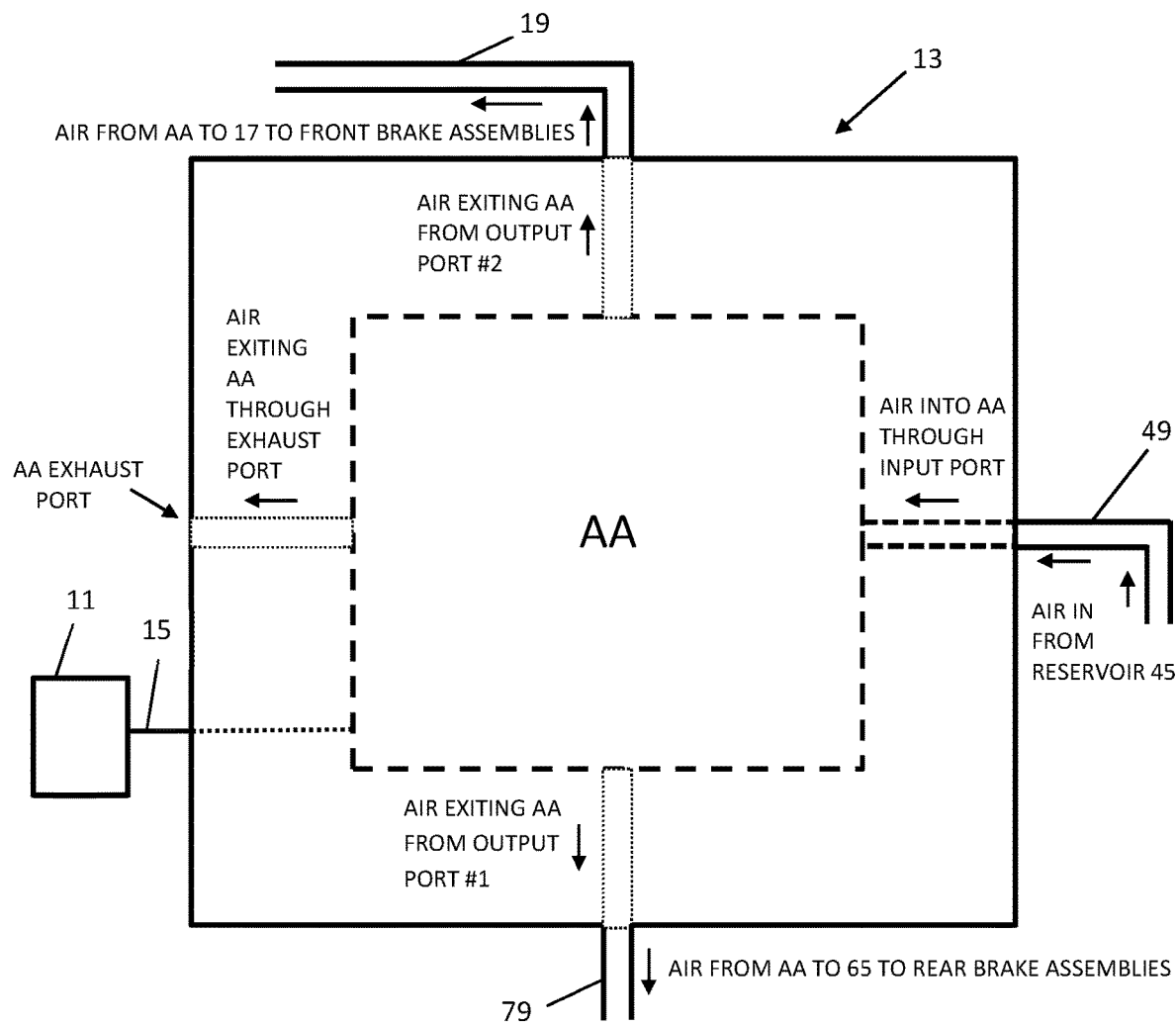
FIG. 5A is a schematic illustration of an actuation apparatus including one solenoid operated pneumatic valve for single stage braking, the valve having two out ports, one for sending air toward the front brake assemblies and the other for sending air toward the rear brake assemblies.
Figure 5B:
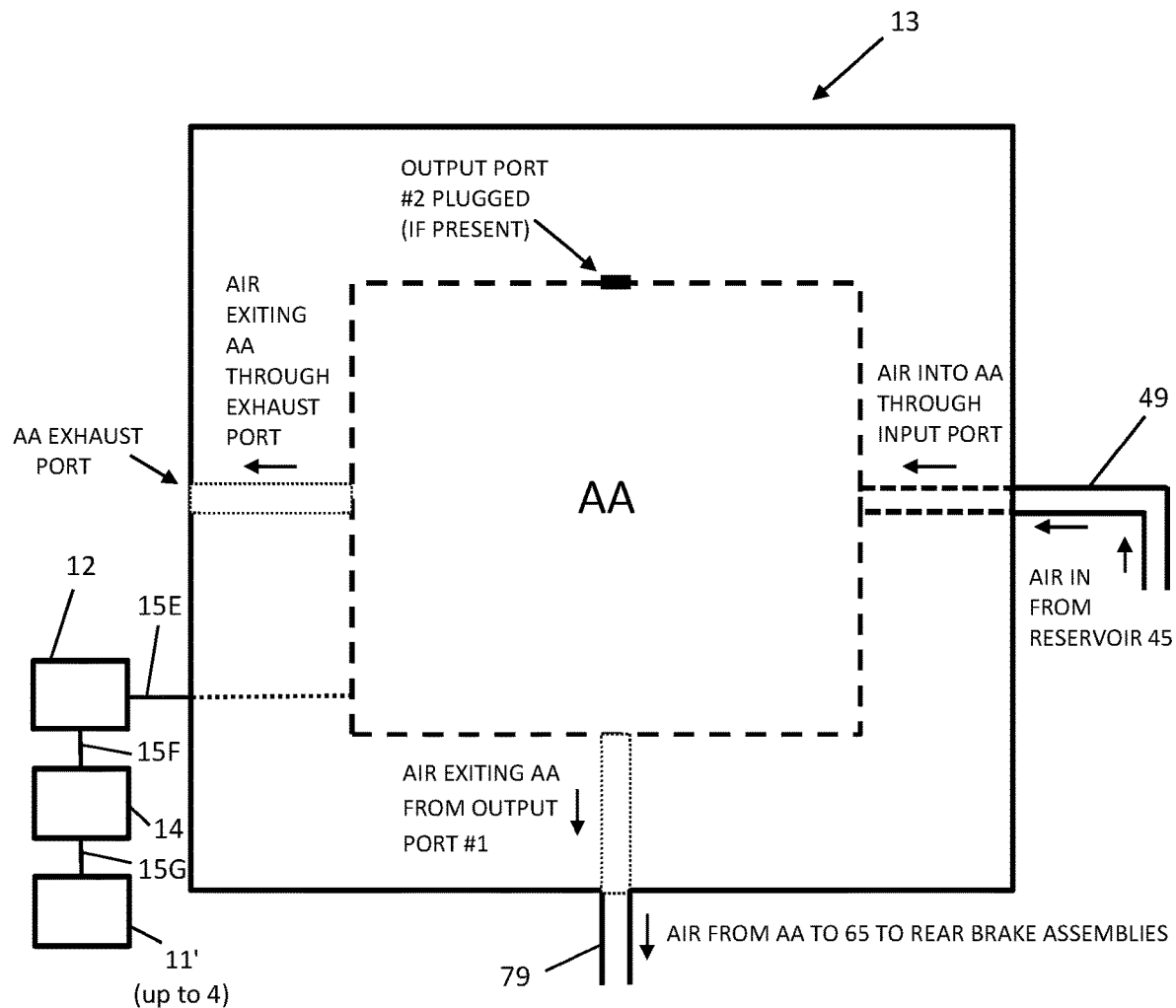
FIG. 5B is a schematic illustration of an actuation apparatus including one solenoid operated pneumatic valve for single stage braking, the valve having two out ports with one sending air toward the rear brake assemblies and the other being plugged.

FIGS. 5A and 5B schematically illustrate embodiments wherein the actuation apparatus (13) incorporates a single normally closed solenoid operated pneumatic valve (AA) (versions (I) and (II) of the automatic braking system; see FIGS. 1 and 2). In the alternative embodiment of the automatic braking system illustrated in FIG. 3 (version (III); single-stage, with individual control of brake assemblies), the actuation apparatus (13') includes four normally closed solenoid operated pneumatic valves (A, B, C and D) as schematically illustrated in FIG. 6, with each solenoid valve operating one of the individual brake assemblies/brake units. In the alternative embodiment of the automatic braking system illustrated in FIG. 4 (version (IV); multi-stage, without individual control of the brake assemblies), the actuation apparatus (13") includes four normally closed solenoid operated pneumatic valves (A', B', C' and D') as schematically illustrated in FIG. 7, with each valve opening sequentially as discussed above depending on the calculated closure time to collision value.

Additionally, while in the embodiments of FIG. 1 and FIG. 2 only a single normally closed solenoid operated pneumatic valve is needed, it is also within the scope of this disclosure that an actuation apparatus having multiple normally closed solenoid valves (such as apparatus (13")) may be used in the systems, such as illustrated in FIG. 7. If a four-valve actuation apparatus (13") having four different solenoid valves is incorporated in the system, then for single-stage operation as per embodiments I and II, only one of the solenoid valves would be electrically connected to the collision warning device (11/11') (directly or indirectly) and connected via a pneumatic line (49) to receive air from reservoir (45). In this regard, the valve would require two separate output ports to transport air to/toward the front brake assemblies (e.g., through hose (19)) and to/toward the rear brake assemblies (e.g., through hose 79), or air separate pneumatic lines may be connected to separately but concurrently send air from the valve to the front and rear brake assemblies. In this optional embodiment, the braking system installer would select which valve (each having different output port diameters, as discussed below) to connect to the system.

As mentioned above, in a multi-stage automatic collision avoidance system as illustrated in FIG. 4, multiple solenoid valves are used in actuation apparatus (13") with each of the solenoid valves being fabricated (custom machined or commercially purchased) to have output ports having different diameters than the other solenoid valves, with each valve providing a different quantity of air depending on how quickly the vehicle needs to brake, as determined by the calculated time to collision value. If the valves are commercially purchased and have more than one output port, the extra ports are plugged shut (not counting the exhaust port). Further detail is provided below. Similarly, in the embodiment of FIG. 3, which utilizes a multiple solenoid valve actuation apparatus (13') as illustrated in FIG. 6, each of the solenoid operated pneumatic valves (as custom machined or as purchased) may either have only a single output port or may have two or more output ports with all but one being plugged shut (not counting the exhaust port).

In every automatic braking system of this disclosure, all of the solenoid valves are widely commercially available, and as stated above, each solenoid valve is most preferably a 3-way, normally closed solenoid valve, allowing air to flow in ($1^{st}$ way) and out ($2^{nd}$ way), and also having an exhaust ($3^{rd}$ way) that only opens when the input and output ports are closed, i.e., in a "normally closed" solenoid valve it is the output ports that are normally closed and the exhaust port is normally open in the valve's default, inactive state.

Figure 13:
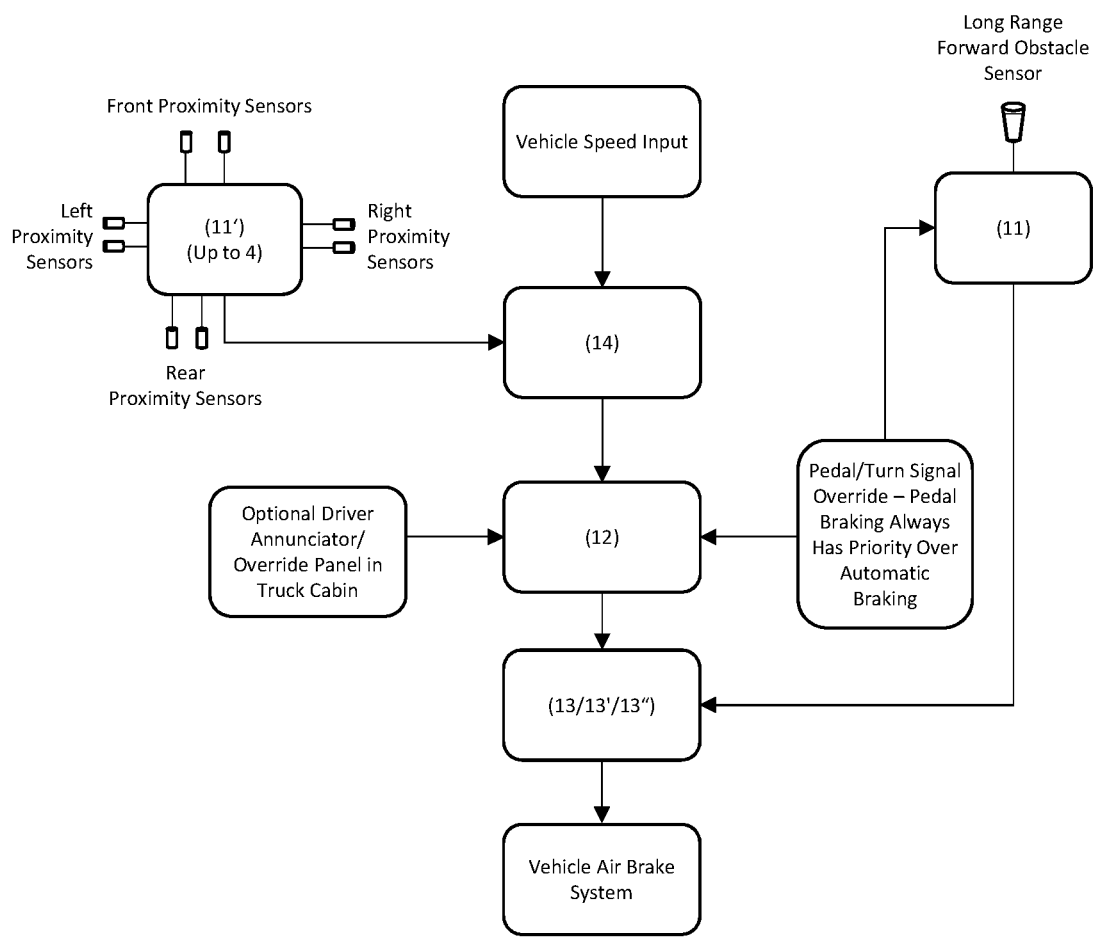
FIG. 13 is a flow diagram illustrating an exemplary system with both a forward collision avoidance system and 360° Collision avoidance system installed in a vehicle.

Any commercially available, normally closed solenoid operated valve that is at least a 3-way valve is useful herein, with a preferred three-way solenoid operated valve being, for example, a 3 Way, 2 Position, 3V210-08 model type, ¼" BSP pneumatic solenoid valve commercially available from such Airtac International Group of Taiwan, or from various other commercial sources. Also useful are 3-way or 4-way normally closed pneumatic solenoid valve models 4V210-08, 3V210-06, 2V02-08 and 2V02-06, each of which is commercially available. As previously noted, if the solenoid valve has additional ports that are not needed for output or input air flow (e.g., if a 4-way valve is used but only a 3-way valve is needed), the additional ports may be plugged (such as schematically illustrated in FIG. 5B), and if the valve is a 4-way or 5-way (or more) valve, it will still be pneumatically connected to be used as s 3-way valve (1-way air input; 1-way air output (with one or more output ports); 1-way exhaust), with unused ports being plugged. In an embodiment where a vehicle is equipped with both one of the forward collision avoidance systems and also the 360° collision avoidance system, such as illustrated in FIG. 13, a 3-way valve may be used and only a single actuation apparatus (13/13'/13") is needed for the vehicle to be equipped with both systems. Additionally, while it is most preferred that the two output ports from the solenoid operated pneumatic valve (one transporting air to/toward the front pneumatic brake assemblies through pneumatic line (19) and another to/toward the rear pneumatic brake assemblies through pneumatic line (79)) have the same diameter, the diameters may also be different. The size of the diameter affects the quantity of air flow to the brakes, with greater air flow going through a larger diameter port relative to a smaller diameter port, and a larger diameter port going to, for example, the rear brakes, will cause a faster pressure buildup at the rear brakes relative to the front brakes, even though the front and rear brakes will still be pressurized concurrently (in unison).

As illustrated in each of FIGS. 5A, 5B, 6 and 7, the solenoid valves are held within an enclosure, such as a box fabricated from fiberglass, plastic or metal (such as steel or aluminum, and the like), having dimensions sufficient to retain the solenoid valve(s) and any other pneumatic and electrical components (for example, a 3-12" cube or rectangular box having height x. width x. depth dimensions of from about 3 inches to 12 inches for each dimension; e.g. 8" height x. 8" width x. 8" depth, or 8" height x. 12" width x. 8" depth). The box has holes drilled in its walls to allow for wiring and to allow for the pneumatic line/hose connections with the valve input and output ports, and to allow for exhaust air to be evacuated out of the valves. In each of FIGS. 5A, 5B, 6 and 7, components within each of the actuation apparatuses (13/13'/13") are outlined with dashed or dotted lines, including the solenoid valves (illustrated schematically as a simple box), the internal pneumatic lines/hoses to and from the input/output ports, and optional air manifolds transporting the input, output and exhaust air flows to and from the solenoid valve input/output/exhaust ports, and the electrical connections/wires (15, 15A, 15B, 15C, 15D, 15A', 15B', 15C', 15D', 15E/15F/15G).

With particular reference to FIG. 6, the exhaust ports of each of the solenoid valves A, B, C and D may be pneumatically connected (with pneumatic lines/hoses) to an exhaust air manifold (82) that is retained within the box of the apparatus (13'), allowing for exhaust air from all of the solenoid valves to be merged and exhausted into the atmosphere from a single exhaust port of the actuation apparatus (13'). As illustrated, if necessary, exhaust manifold (82) may be connected to a pneumatic hose or connector (83) that is adjoined with an output port of the actuation apparatus (13'), or the exhaust manifold (82) itself may be positioned to abut any inside wall of the actuation apparatus (13') to exhaust the air without the aid of any additional pneumatic components. The use of such an air manifold, which is a conventional and commercially available pneumatic component, to merge the exhaust air flows is not mandatory and is just an optional but preferred optimization of the apparatus. For example, actuation apparatus (13') may be designed to allow individual exhausting of exhaust air from each solenoid valve without use of an exhaust manifold, such as illustrated in the actuation apparatus (13") of FIG. 7. The exact placement of the exhaust air manifold (82) as illustrated in FIG. 6 is also not mandatory and is customizable, as are the locations of the exhaust ports of the solenoid valves and the actuation apparatus. The location of the input/output/exhaust ports may similarly vary in apparatuses (13) and (13") of FIGS. 5A, 5B and 7, respectively, if desired.

As illustrated in the preferred embodiment of FIG. 7, which provides multi-stage automatic braking by merging the output air flows of solenoid valves A', B', C' and D', an output air manifold (84) may be incorporated in the actuation apparatus (13") to merge output air flows. FIG. 7 shows each of solenoid valves A', B', C' and D' having a single output port with each of said output ports being pneumatically connected (with hoses) to the output air manifold (84). While output air manifold (84) is illustrated as being positioned within the box of apparatus (13"), it may alternatively be outside of box (13"). In another embodiment of the multi-stage automatic braking system of FIG. 4, an exhaust air manifold (such as that illustrated in FIG. 6) may also be incorporated within actuation apparatus (13") in addition to the output air manifold (84), but such an exhaust air manifold is not illustrated in FIG. 7 for clarity purposes.

As discussed herein, the single stream of air flowing to output air manifold (84) may include air from only valve (A') or up to all four of the valves A', B', C' and D' (in that order: A'→B'→C'→D'), depending on how many are needed based on the calculated imminence of collision. As illustrated, if necessary, output air manifold (84) may be connected to a pneumatic hose or connector (85) that is adjoined with an output port of the actuation apparatus (13"), or the air output manifold (84) itself may be positioned at the inside wall of the actuation apparatus (13"), sending air directly into pneumatic hose/line (86) or directly into connector (87) without the aid of any additional pneumatic connectors. In the preferred embodiment as illustrated in FIG. 7, the output air manifold (84) is within the actuation apparatus (13") and the air flows from the solenoid valves into the manifold and to connector (87) which is preferably a T-connector (87) or the like. Connector (87) then distributes the air to the front brakes via pneumatic line (19') (and via valves (17) and (36), as illustrated in FIG. 4) and to the rear brakes via pneumatic line (79') (and via valves (65) and (51), as also illustrated in FIG. 4).

Figure 14:
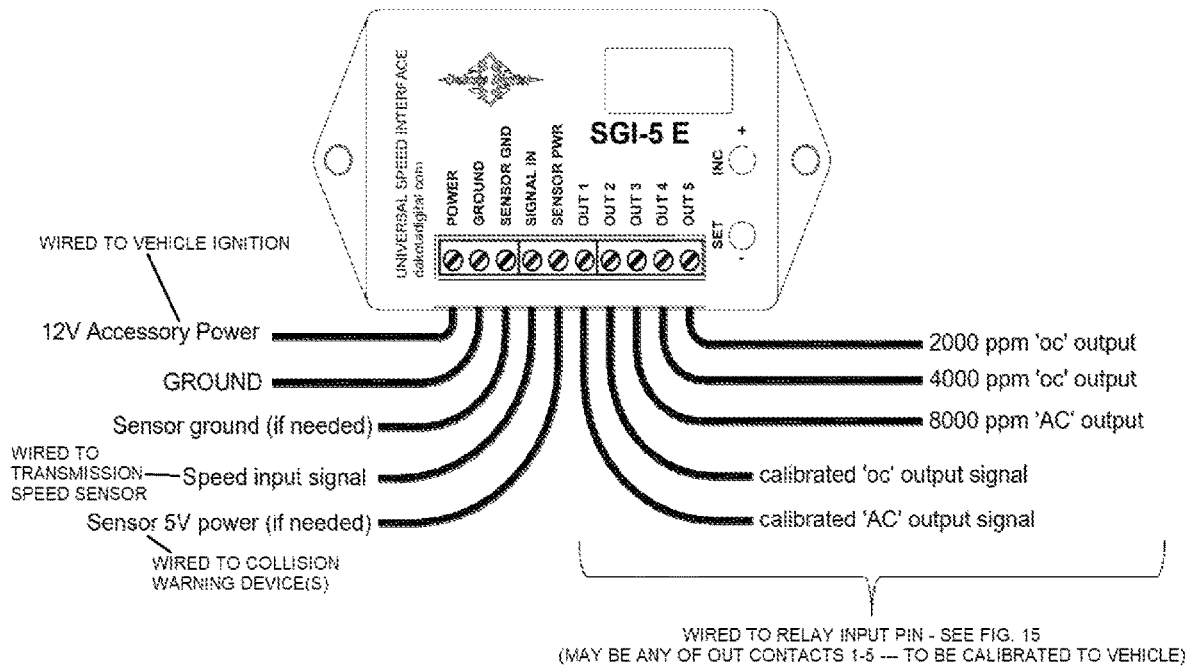
FIG. 14 is a wiring diagram for an interface used in the 360° Collision avoidance system.

Each of systems (I), (III) and (IV) are Forward Collision Avoidance systems that are intended for use in applications when the driven vehicle is traveling forward at a speed of about 10 miles/hour or faster (although it can be set to function at speeds below 10 miles/hour). In this regard, in each of systems (I), (III) and (IV), speed data is communicated to the collision warning device (11) via electrical connection to the vehicle CAN Bus system (as discussed further below), or via direct electrical connection with the speed sensor connected to the vehicle transmission (the transmission speed sensor), or via direct electrical connection with the vehicle speedometer, or with the vehicle speed electronic control unit (speed ECU) which receives speed information signals from the transmission speed sensor and distributes that information to other system components (such as the speedometer). Each of these connection options may also optionally go through a relay or switch. The speed setting of the automatic braking system is set by programming the collision warning device (11), or it may be set manually if that is a feature of the collision warning device (11), or may be set with an interface such as illustrated in FIG. 14, or may be set with a control relay switch, such as a power control relay connected to the collision warning device (11).

Each of systems (I), (II), (III) and (IV) utilizes the solenoid operated pneumatic valves to control the concurrent automatic braking of front brake assemblies (41), (43) and rear brake assemblies (59A) and (59B) (which function as a unit (59)) and (61A) and (61B) (which function as a unit (61)). As discussed further below, each of systems (I), (III) and (IV) use the same type of collision warning device (11) that detects obstacles and calculates a time to potential collision risk, while the collision warning device (11') of 360° system (II) uses exterior obstacle proximity sensors and is unique to that system.

Each of systems (I), (III) and (IV) operates with a collision warning system (11) that utilizes camera-based (optical vision) ranging technology, or radar based ranging technology, or laser based ranging technology, or a combination thereof, to continuously monitor for the presence of obstacles in front of the driven vehicle and calculate a closure time with said obstacles in order to avoid or mitigate collision impacts of a driven vehicle with obstacles. To calculate the closure time, the collision warning device (11) uses speed data from the vehicle CAN Bus system (or directly from the speed ECU, or transmission speed sensor, or the vehicle speedometer, etc.) which is normally collected/monitored by the vehicle speed sensor/computer system, together with the determined distance between the driven vehicle and the detected foregoing obstacle. Any other type of technology capable of detecting the presence of foregoing obstacles and calculating a closure time with the obstacles is also acceptable even if it does not necessarily function by transmitting and receiving signals. The detected obstacles may be other vehicles, such as vehicles traveling in front of the driven vehicle, wherein the "driven vehicle" is the vehicle equipped with the automatic braking collision avoidance system and wherein the vehicle traveling in front of the driven vehicle is referred to herein as a "foregoing vehicle," or the obstacles may be objects, structures or even pedestrians rather than other vehicles.

In the most preferred embodiments of system (I), (II) and (IV), the collision warning device (11) used in the Forward Collision Avoidance system embodiment is one that detects foregoing obstacles and calculates a closure time with said obstacles by continuously transmitting and receiving signals while the vehicle is powered on, and most preferably these signals are radar signals or laser signals, or a combination thereof, which may be used with or without an optical vision system (camera based ranging technology).

The collision warning device (11) of Forward Collision Avoidance systems (I), (II) and (IV) has the ability to energize each solenoid valve when said closure time is at or below a pre-set time to collision values and keeps the solenoid(s) energized until said closure time is above said pre-set time to collision value. In this regard, the collision warning device (11), which is preferably a programmable microcontroller having a memory, is programmed (pre-set) using programming software that is typically bundled with the device by its manufacturer. Programming is performed by connecting the device (11) to a computer, running the software and adjusting the desired settings to trigger energizing or de-energizing of the wire(s) (e.g., (15)) that is/are connected to the solenoid valve(s) with power from the driven vehicle. For example, a pin or other electrical contact of the collision warning device (11) to which wire(s) (15, etc.) is/are attached may be energized upon the closure time condition being met, and accordingly the wire connected to that pin/electrical contact will be energized, thereby energizing the solenoid valve at the other end of the wire(s). The collision warning device may alternatively be programmed with conventional programming software using methods that are conventionally known in the art using a conventional programming language. Regardless the programming means, the collision warning device (11) is programmed to send power to and thereby energize the solenoid valve(s) when the pre-decided time to collision threshold value is calculated by the collision warning device (11) based on factors such as speed of the driven vehicle (with speed data taken from the vehicle CAN Bus system/transmission speed sensor/speed ECU/speedometer, etc., as discussed above), the distance between the driven vehicle and the obstacle (determined by the collision warning device (11) itself, and optionally the speed of the foregoing obstacle if it is another vehicle (as calculated by the collision warning device (11)). If the calculated closure time is at that pre-set time value (i.e., a determination that a collision would occur within that pre-set time to collision value based on the above factors) or below that pre-set time to collision value (i.e., a determination that a collision would occur sooner than that pre-set time to collision based on the above factors), the collision warning device (11) energizes the solenoid valve via wire(s) (e.g., 15) using power from the car electrical system sent through the collision warning device (11). As previously stated, energizing a solenoid valve causes it to open and begins the flow of air concurrently to/toward the front pneumatic brake assembles and the rear pneumatic brake assemblies.

Useful collision warning devices (11) that can detect objects and calculate closure times by transmitting and receiving signals as desired that are particularly suitable for Forward Collision Avoidance systems (I), (III) and (IV) are commercially available, with preferred collision warning devices non-exclusively including devices available from manufacturers such as WABCO Holdings, Inc. of Auderghem, Belgium, such as their OnGuardACTIVE™ Collision Mitigation System; from Bendix Commercial Vehicle Systems, LLC from Elyria, Ohio, such as their Bendix® Wingman® Advanced™ device (e.g., model BW2852, programmable with bundled Bendix software); from Mobileye Vision Technologies Ltd. of Israel, such as their Mobileye 6 series Forward Collision Warning devices; and monitoring systems from Brigade Electronics Inc. of Portland, Ind.

Figure 12:
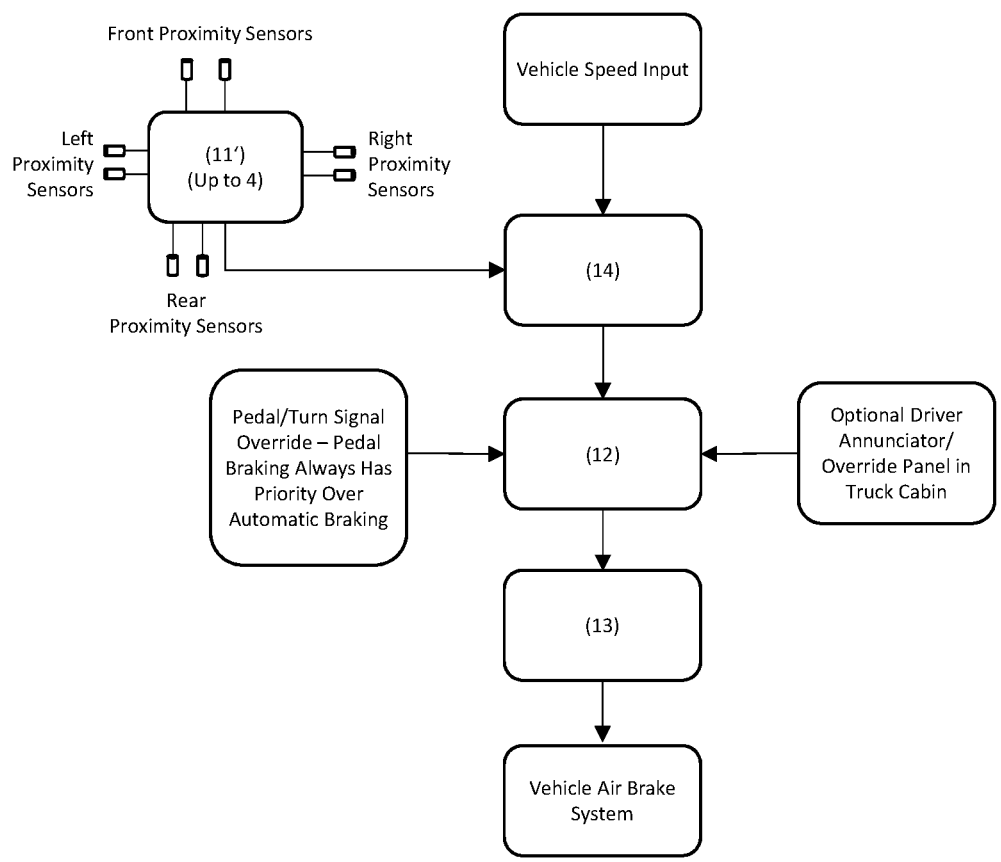
FIG. 12 is a flow diagram illustrating an exemplary installed 360° Collision avoidance system.

The 360° Collision Avoidance system (version (II)), which may operate with a pneumatic braking system as illustrated in either FIG. 1 (operating both the front and rear brakes) or FIG. 2 (operating only the rear brakes), is intended for use in applications when the driven vehicle is traveling at a speed of less than 10 miles/hour, preferably from 0 miles/hour to 5 miles/hour, and most preferably from 0-3 miles per hour (either forward or in reverse). This 360° Collision Avoidance system operates with one or more collision warning systems (11') to continuously monitor for the presence of obstacles in proximity of at least one side and/or end of the vehicle, but like the forward collision avoidance system, it utilizes only a single (normally closed) solenoid operated pneumatic valve to control automatic braking of front brake assemblies (41), (43) and rear brake units (59), (61). In this embodiment, one collision warning device (11') is used for each side or end of the vehicle to be monitored, and each utilizes vehicle sensors and ranging technology such as sonar, cameras and/or laser technology (e.g., Light Detection and Ranging ("LIDAR")) to detect objects in proximity of the vehicle to avoid or mitigate collision impacts with such obstacles (such as pedestrians, other vehicles, objects or structures). These types of collision warning devices (11') are commercially available, as discussed in greater detail below. An exemplary installed configuration of this 360° system is illustrated in FIG. 12 which shows a box labeled as "(11')×4," which references the use of four devices (11'), with each device (11') including proximity sensors and wherein one device (11') is for each of the front end, rear end, left side and right side of the vehicle. As schematically illustrated, collision warning device receives the necessary threshold information from the vehicle that allows automatic braking to be capable of being activated, i.e., the speed is within the required range and the brake pedal is not depressed, and any other pre-set factors (such as the turn signals being activated or not). The devices (11') will then trigger the actuation apparatus (13) to open the solenoid valves if any obstacles are detected within proximity of the vehicle, with the system using the existing pneumatic brakes of the vehicle, and with the driver always having the option of terminating or preventing the automatic braking by pressing the brake pedal (unless an optional override is installed and activated), and optionally by activating a turn signal.

In addition to being electrically connected to the solenoid, the collision warning devices (11)/(11') are also electrically connected (wired) to, and electrically communicate with, the existing vehicle computer network. A computer network is a standard feature of all modern vehicles. The existing vehicle computer network controls all the electrical functions of the vehicle such as activating the turn signal lights or brake lights and many other features of modern vehicles, such as air bags, power windows, doors locks, cruise control, electronic steering, etc., and monitors the speed of the driven vehicle. The vehicle computer network, at least in most vehicles built after 1995, is a Controller Area Network bus protocol, commonly known in the art and is referred to as a CAN Bus or CAN Bus protocol. This CAN Bus is a system of wires, sensors and electronic control units (ECUs) within the vehicle that gathers and monitors data about the vehicle (such as vehicle speed) and controls electrical outputs without a single central host computer.

By virtue of being electrically connected to the existing vehicle computer network, the collision warning device (11)/(11') allows the vehicle braking system to be operated in a way that provides the vehicle driver with control over braking at all times. Particularly, the collision warning device(s) (11)/(11') are programmed with conventional coding software (bundled or other coding software) as discussed herein to de-energize the solenoid when the driver brake pedal (21) is pressed, and optionally when other vehicle systems are activated, such as activating the vehicle turn signal lights (not illustrated). This can be done because the driver brake pedal (21) and turn signal lights are also electrically connected to the vehicle electrical system (e.g., to the CAN Bus), and the collision warning device (11)/(11') can be programmed to turning off the flow of electrical energy to the solenoid valve (e.g., by deactivating an electrical contact of the collision warning device (11)/(11') that connected the device(s) (11)/(11') to the solenoid valve(s) through wire(s) (15, 15A, 15B, 15C, 15D, 15A', 15B', 15C', 15D', 15E/15F/15G)). In this regard, when a vehicle driver presses the brake pedal (21) or moves the turn signal lever/arm to activate the left or right turn signal lights, the vehicle sends an electronic signal through the CAN Bus instructing the brake lights to illuminate or the turn signal lights to blink. This same electronic signal is detected by the collision warning device (11) which is programmed as discussed above to then de-energize the solenoid by stopping the flow of electrical energy to the solenoid, causing the solenoid valve to close when the brake pedal is pressed, and optionally when either the left or right turn signal is activated, thereby deactivating (shutting off) the automatic braking collision avoidance system. Accordingly, the driver may at any time deactivate the automatic braking collision avoidance system by forcing the closure of the solenoid valve by engaging the brake pedal (21) and, optionally, by activating either of the turn signals, which thereby stops the automatic pressurization of the front and rear pneumatic brakes. If this is accomplished by pressing the brake pedal (21), the driven vehicle will instead brake normally by pressurizing the front and rear pneumatic brakes with the air flow through the standard brake lines and standard pneumatic components of the factory installed pneumatic pedal braking system. Additionally, automatic braking is also not capable of activation if the brake pedal (21) is depressed (or if either of the turn signals are on, if that option is installed). However, in optional embodiments (e.g., if desired by the vehicle manufacturer or owner), a bypass may be installed in the vehicle allowing the driver to override such automatic de-activation of automatic braking (or the prevention of its activation), for example, by connecting the collision warning device to a relay or switch, with the relay/switch being electrically positioned between the collision warning device and its electrical connection to the CAN Bus, so that the deactivation of the collision warning device (11)/(11'), upon pressing the brake pedal or upon activating the turn signals, can be blocked and unblocked as desired by the driver. This could be controlled, for example, by a button or switch installed in the vehicle cabin.

Assuming there is no such override installed, when the driver presses the brake pedal (21), the front pneumatic brakes and the rear pneumatic brakes are both pressurized pneumatically as per the factory installed braking system with air pressure that is proportional to the force with which the driver presses the brake pedal. With reference to FIG. 1, pressing the brake pedal (21) will activate the opening of both a rear brake control valve (23) and a front brake control valve (25). In modern trucks this functions electrically with rear brake control valve (23) and front brake control valve (25) also being electrically to the vehicle CAN Bus, i.e., pressing the brake pedal (21) electrically signals the rear brake control valve (23) and front brake control valve (25) to open by sending a corresponding signal through the wires of the CAN Bus. Alternatively, brake pedal (21) may be pneumatically connected to both rear brake control valve (23) and front brake control valve (25), wherein pressing the brake pedal (21) mechanically opens each of the rear brake control valve (23) and front brake control valve (25) to initiate the flow of pressurized air to the rear pneumatic brake assemblies and front pneumatic brake assemblies, respectively. However, in systems having a CAN Bus, it is conventional that the brake pedal (21) is electrically connected to the CAN Bus even if valves (23) and (25) are not.

As illustrated in each of FIGS. 1-4, rear brake control valve (23) is pneumatically connected to first air pressure reservoir (45) by pneumatic line (44). In operation, opening of the rear brake control valve (23) that is triggered by pressing on the brake pedal (21) allows pressurized air from first air pressure reservoir (45) to pass along pneumatic line (71) to a connection gate (73) that is pneumatically connected to both said rear brake control valve (23) and the rear brake 2-way valve (65) (although valve (65) is bypassed in individual braking control system (III) as illustrated in FIG. 3). From connection gate (73), in all but the systems of FIG. 3, the pressurized air travels along pneumatic line (72) to the rear brake 2-way valve (65), wherein said rear brake 2-way valve (65) is open to pneumatic line (63) but closed to pneumatic line (79). In this regard, since pressing of the brake pedal (21) causes the solenoid to be de-energized and thereby causes the closing of the solenoid valve, air passing through pneumatic line (72) is able to pass through valve (65), which is typically a ball valve, and into pneumatic line (63) without obstruction (e.g., by shifting the position of the ball in the ball valve (65)). Pneumatic line (63) connects the rear brake 2-way valve (65) with input (67A) of the rear relay valve (51), and air then proceeds to be distributed throughout the rear pneumatic brake units (59) and (61) and optionally a trailer brake circuit (77) as described above. In the individual braking control system (III), as illustrated in FIG. 3, valve (65) is not needed and air from pedal braking will be transported directly from gate (73) to input (67A) of valve (51) directly via pneumatic line (72'). It should also be noted that in each system of this disclosure, gate (73), which is standard in most vehicles, may optionally be bypassed as well.

With respect to the front brake assemblies, front brake control valve (25) is also part of the existing, factory installed pneumatic braking system of the vehicle and has no particular function in the automatic braking system of this disclosure. As illustrated in FIG. 1, front brake control valve (25) is pneumatically connected to a second air pressure reservoir (29) by pneumatic line (31), although it could optionally be connected to first air pressure reservoir (45). In operation of the systems of FIG. 1 and FIG. 4, opening of the front brake control valve (25) by pressing on the brake pedal (21) allows pressurized air from said second air pressure reservoir (29) to pass along pneumatic line (81) to front brake 2-way valve (17), wherein pneumatic line (81) is pneumatically connected to both front brake control valve (25) and front brake 2-way valve (17). The air then proceeds to be distributed to the front pneumatic brake assemblies as described above. In operation of the 360° collision avoidance system version of FIG. 2 and the individual braking control system (III) of FIG. 3, air is distributed in a similar way except there is no valve (17) and thus air from valve (25) passes along pneumatic line (81') directly to gate (36), from which it is distributed to the left and right front brakes (41) and (43) in the manner illustrated.

In accordance with this disclosure, with the exception of the rear brake only 360° collision avoidance system embodiment of FIG. 2, when the automatic braking systems are active and each of the front brake assemblies and rear brake assemblies/units are pressurized with air that originated at the first pressure reservoir (45), the braking air pressure being applied to each of the front pneumatic brake assemblies and rear pneumatic brake assemblies is thus exactly the same for all of said brake assemblies, unless or until the pressure reaches a maximum level setting for the anti-lock brakes. That maximum pressure in some instances may be lower for the front brake assemblies (e.g., 60 psi) than for the rear brake assemblies/units (e.g., 120 psi), depending on what is installed by the vehicle manufacturer. All of the front and rear antilock brake modules will similarly receive air flow from the automatic braking system concurrently. This is despite each of said front brake assemblies and rear brake assemblies/units receiving air through separate pneumatic hoses/lines. When the air pressure at the rear pneumatic brake assemblies and the air pressure at the front pneumatic brake assemblies each reach their maximum air pressure settings (e.g., 60 psi or 120 psi, again, as determined by limits set by the factory installed vehicle braking system, which may be controlled by a pressure controlling air regulator), further pressure increases are ceased (e.g., by the air regulator) and the pressure on the brakes is maintained (e.g., by the air regulator or by the ABS control module) until the automatic braking system is deactivated in the ways discussed herein. Additionally, the maximum braking pressure permitted by the pressure of the air reservoir (60 psi-120 psi, as stated above) may never be reached, because these pressure limits are not necessarily needed to stop the vehicle or to keep it stopped (e.g., if it is moving at a low speed).

Once the vehicle has been brought to a stop or sufficiently slowed down, either by using an automatic braking system of this disclosure or by the driver pressing on the brake pedal (21), the air within the braking system is released as done normally by the factory installed air brake system. For example, if automatic braking is deactivated by de-energizing the solenoid(s), then air within the front pneumatic brake assemblies/pneumatic lines will reverse and pass through pneumatic line (81/81') and be released out of an exhaust port of the front brake control valve (25) into the atmosphere. The front brake assemblies/pneumatic lines are similarly exhausted of air if the brake pedal (21) is released, which causes valve (25) to close and release exhaust air into the atmosphere. Similarly, as also illustrated in FIGS. 1, 2 and 4, air within the rear pneumatic brake assemblies/pneumatic lines will reverse back through pneumatic lines (53, 53A, 53B) and (54, 54A, 54B), also passing through the ABS control modules, back to rear relay valve (51), and then it is exhausted out of an exhaust port of rear relay valve (51). In the embodiment of FIG. 3, air similarly reverses back through pneumatic lines (53', 53A, 53B) and (54', 54A, 54B), also passing through the ABS control modules and 2-way valves (51A) and (51B), back to rear relay valve (51), and then it is exhausted out of an exhaust port of rear relay valve (51). This same exhaust port of rear relay valve (51) allows air from the trailer brake circuit (77) of an optional trailer to be exhausted out as well, as per the factory installed brake system. Any air in the brake assemblies/pneumatic lines after pedal braking is similarly exhausted because releasing brake pedal (21) closes rear brake control valve (23), which causes any air within the pneumatic lines connecting front brake control valve (23) with rear relay valve (51) to be exhausted out of the exhaust port of rear relay valve (51) by flowing through pneumatic line (52) to rear relay valve (51) and out its exhaust port into the atmosphere. Finally, upon closing of the solenoid operated pneumatic valves when they are deactivated, air within the valve(s) is vented out of their exhaust ports.

It should be understood that the general configuration of the manufacturer installed air braking system is the same for each of the four automatic braking systems (I), (II), (III) and (IV), such as the pneumatic components of the pedal braking system, the way air is the air pressure reservoirs are pressurized, the set-up of the front and rear wheels and their brake assemblies, and the incorporation of front and rear anti-lock brake control modules. In this regard, commercial vehicle air brake systems operate with air pressure from air reservoirs containing a volume of high pressure air, ranging from about 60 psi to 120 psi (the maximum allowed by the Department of Transportation (D.O.T.)), depending upon the factory design of the braking system. Typically, air reservoirs used in air brake systems are under a pressure of from about 60 psi to 120 psi, with heavier vehicles utilizing higher air pressure reservoirs because they require generate greater momentum than lighter vehicles and thus require greater air flow and braking force to stop. The pressure of the air being sent through the solenoid valve and to the front and rear pneumatic brake assemblies is the same as the maximum pressure setting of the air reservoir supply, but quantity of air flowing to the brakes will vary as discussed above depending on the diameter of the valve output ports. This is common to all system versions (I)-(IV).

In conventional braking systems, each of the front pneumatic brake assemblies and rear pneumatic brake units are pneumatically connected to their own separate air reservoirs, although as stated above they both may use the same air reservoir. In the all of the automatic braking systems (I)-(IV) of the present disclosure, a second air pressure reservoir (29) is illustrated as only being used during a pedal braking operation wherein air is sent to the front brake assemblies through a front brake control valve (25). Each air reservoir is filled/pressurized with a standard air compressor that is original to the vehicle, up to a max air pressure setting of the compressor (or up to a max pressure as set by an air regulator, if present, that would also be standard equipment installed by the vehicle manufacturer). This again is standard for all four systems (I)-(IV) of this disclosure.

Each of the front pneumatic brake assemblies and the rear pneumatic brake assemblies in all four versions (I)-(IV) are standard foundation brakes that incorporate standard factory pneumatic components that function to stop the vehicle wheels from moving by using air to pressurize standard brake assembly components, and as used herein the front pneumatic brake assemblies (41, 43) and the rear pneumatic brake assemblies (59A, 59B, 61A, 61B) refer to service brakes rather than brakes used as emergency brakes. The specific pneumatic components of a "brake assembly" may vary by vehicle without affecting the scope of the automatic braking collision avoidance system of this disclosure. In this regard, the automatic braking system of this disclosure may be integrated into any factory pneumatic air braking system. In a typical pneumatic air braking system for trucks, buses and other similar heavy vehicles, the front pneumatic brake assembly comprises a left front anti-lock braking system (ABS) control module (37) that is pneumatically connected to the left front brake assembly (41), and a right front ABS control module (39) that is pneumatically connected to the right front brake assembly (43). These brake assemblies and ABS control modules are connected by pneumatic lines (pneumatic hoses/tubes) (40C) and (40D) as illustrated in FIG. 1, and optionally one or more other pneumatic components such as valves and hoses that assist in transporting and/or distributing air to the brake assemblies. As illustrated in FIG. 1, the left front anti-lock braking system control module (37) is pneumatically located between the solenoid operated pneumatic valve and the left front brake assembly (41), and the right front anti-lock braking system control module (39) is pneumatically located between the solenoid operated pneumatic valve and the right front brake assembly (43).

Additional features specific to each of these four versions of the automatic braking collision avoidance system of this disclosure are described in greater detail below, but any features not specifically described below as being exclusive to one particular system should be viewed as the same for all system versions (I), (II), (III) and (IV).

I. Single-Stage Braking Forward Collision Avoidance System without Individual Brake Control In the Single-Stage Braking Forward Collision Avoidance system (I), reaching a single pre-set time to collision value will automatically trigger the energizing/opening of valve AA to initiate concurrent braking of the front and rear vehicle air brakes. The single pre-set time to collision value may be any value as desired by the manufacturer or even the owner of the vehicle and will be programmed by the installer. In a preferred embodiment, the pre-set time to collision value is a set time ranging from about 0.6 seconds up to 1.0 seconds, wherein if the collision warning device (11) determines that the driven vehicle will collide with a foregoing obstacle in a set time within the range of about 0.6 seconds up to 1.0 seconds (as determined by programming the collision warning device (11) as discussed above), and the vehicle speed is above the required threshold, the collision warning device (11) automatically allows electric power to be sent to the solenoid valve (such as by energizing an electrical contact of the collision warning device (11) that has a wires connected to it, which wire is connected to the solenoid valve), thereby energizing the solenoid within the valve body and causing valve to open. The collision warning device (11) is constantly monitoring the presence of foregoing obstacles and constantly calculating time to collision values. If the solenoid has been energized and the risk of collision is reduced, i.e., the calculated time to collision is no longer at or within, for example, 1.0 seconds, e.g., is at 1.1 seconds or longer, the collision warning device (11) is then programmed to terminate the flow of electric power along the wires connected to the solenoid valve (for example, by de-energizing an electrical contact that the wire(s) (15, etc.) is/are connected to, as explained above) causing the solenoid to de-energize and thereby causing the valve to close. Similarly, the solenoid valve, being a normally closed valve, will remain in the closed position when the driven vehicle is turned off, and when the collision warning device (11) does not detect any foregoing obstacles, and when the continuously monitored and calculated closure time is above (i.e., greater time than/longer time than/not within) the pre-set time to collision value range required for the valve to be open. Each of these options is a non-collision condition in which the collision warning device (11) does not trigger energizing of the solenoid valve. The specific closure time threshold that will trigger energizing and de-energizing of the solenoid valve is fully adjustable with the programming software (again, such as by programming the condition at which the power will flow to the electrical contact of the collision warning device (11), thereby controlling when anything connected to it is energized/de-energized) as discussed above and it not required to be 1.0 seconds, although 1.0 seconds is most preferred as it will lead to smoother stopping by activating the automatic braking system sooner than a shorter time. In an alternate embodiment, the energizing/de-energizing is performed through an interface, relay or switch, such as described for the 360° system.

In this single-stage braking system (I), as well as 360° system (II) if it is desired to apply both the front and rear brakes, the solenoid operated valve AA preferably has or is machined to have at least two air output ports for the Forward Collision Avoidance system of FIG. 1, one that transports air originating from the first air pressure reservoir (45) into pneumatic line (19) for transport to/toward the front pneumatic brake assemblies (41) and (43), and another that transports air originating from the first air pressure reservoir (45) into pneumatic line (79) for transport to the rear pneumatic brake assemblies (59 A/B, 61 A/B). Pressurization of the front pneumatic brake assemblies and the rear pneumatic brake assemblies is concurrent because air flows out of the two output ports of the solenoid valve to said front and rear brake assemblies at the same time and without first requiring the rear brakes to be pressurized up to a certain crack or threshold pressure as in the prior art for trucks and other similarly heavy vehicles. The two outputs of the solenoid valve open together when the solenoid of the solenoid valve is energized (and close together when the solenoid of the solenoid valve is de-energized) and therefore air is sent to the front pneumatic brake assemblies and to the rear pneumatic brake assemblies concurrently without intentionally pressurizing the rear brake assemblies/units prior to pressurizing the front brake assemblies.

The size of the output ports determines the quantity of air flow that is transported to the respective front and rear pneumatic brake assemblies/brake units (and this is true for all solenoid valves of this disclosure). The larger the port, the greater the quantity of air that flows to the brake assemblies, which affects the rate of increase of air pressure that is applied to the front brake assemblies and rear brake assemblies/units. Smaller outlet port sizes that limit the flow of air out of the solenoid valve will limit the rate of pressure increase and accomplish a smooth slowing down of the driven vehicle compared to a large outlet port that quickly flushes high pressure air into the pneumatic brake lines and causes the brakes to quickly reach their maximum pressure level and thus their maximum stopping capability. In this regard, for each of the Forward Collision avoidance systems (I) and (III) of FIGS. 1 and 3, it is preferred that each of the outlet ports of solenoid valves AA, A, B, C and D (see FIGS. 5A, 5B and 6) have a diameter of about 3.0 mm or less, preferably from about 2.0 mm or less and more preferably from about 1.0 mm or less, or from about 0.5 mm to about 3.0 mm, more preferably from about 1.0 mm to about 3.0 mm, more preferably from about 1.0 mm to about 2.5 mm, still more preferably from about 1.0 mm to about 2.0 mm and most preferably from about 1.0 mm to about 1.5 mm. The preferred solenoid valve output port diameters for the 360° collision avoidance system (II) and the multi-stage forward collision avoidance system (IV) may be different, as is discussed below. The most preferred outlet port diameter will vary in size within these ranges based on the pressure needed to stop the vehicle depending on its weight and the rate of automatic braking deceleration desired by the vehicle end user.

As illustrated in FIG. 1 (and FIGS. 2-4), the actuation apparatus (13) is pneumatically connected to a first air pressure reservoir (45) via pneumatic line (49) such that air from the reservoir (45) is delivered to the solenoid operated pneumatic valves. In operation of the system of FIG. 1, when the solenoid operated valve AA of actuation apparatus (13) is energized and open, air from the reservoir (45) passes into and through the solenoid operated valve AA and out to the front pneumatic brake assemblies (41 and 43) and to the rear pneumatic brake assemblies (59A/B and 61 A/B) as discussed herein. Air from the reservoir (45) does not flow through the solenoid operated valve when the solenoid operated valve is shut, i.e., when the solenoid is not energized, for example, when there is a non-collision condition.

In the context of the present disclosure, the pre-existing, manufacturer installed pneumatic components assist in transporting and/or distributing air from the solenoid valve (originating at an air reservoir) to the brake assemblies. In the single-stage forward collision avoidance system (I) and 360° collision avoidance system (II) (when it is desired to pressurize the front brakes as well as the rear brakes) the opening of valve AA will send air to the front brakes through pneumatic line (19). In the operation of the front brakes for all four systems of this disclosure, a front connector gate (36) is incorporated to distribute air to flow to the left front brake assembly (41) and the right front brake assembly (43), such as illustrated in FIGS. 1-4. As illustrated in FIG. 1, when air originating at the reservoir (45) is sent through pneumatic line (49) to solenoid operated valve AA, this air then flows through pneumatic line (19) to a front brake 2-way valve (17) before it reaches gate (36). Front brake 2-way valve (17) is a component of the automatic braking collision avoidance system of this disclosure and not a standard factory braking system component. Front brake 2-way valve (17) is pneumatically connected to a front connector gate (36), either with a direct connection (as illustrated in FIG. 1) or by connection with a pneumatic hose (such as exemplified in the FIG. 3 embodiment with the line connections between gate (36) and valves (17A) and (17B)). Air from the front brake 2-way valve (17) is sent through front connector gate (36) which distributes the air to each of the front left and right ABS control modules (37, 39) by passing the air through pneumatic lines (40A) and (40B), respectively, and then to the front left and front right brake assemblies (41, 43) by passing the air through pneumatic lines (40C) and (40D), respectively, causing the brake assemblies to pneumatically engage and the vehicle to slow down and/or stop.

With regard to the rear brakes, the standard factory installed rear pneumatic brakes comprises a left rear brake unit (59), a right rear brake unit (61), a left rear anti-lock braking system control module (55) and a right rear anti-lock braking system control module (57) as well as pneumatic components (e.g., pneumatic lines and/or pneumatic valves) for transporting and/or distributing air from the solenoid valve (originating at an air reservoir) to said rear pneumatic brakes, which will vary somewhat in the individual braking control system of FIG. 3.

The left rear brake unit (59) comprises at least two brake assemblies (59A and 59B), and the right rear brake unit (61) comprises at least two brake assemblies (61A and 61B). The left rear anti-lock braking system control module (55) is pneumatically connected to each brake assembly of the left rear brake unit (59) through pneumatic lines (53A) and (53B) (typically with line (53B) being pneumatically connected to and branching off from line (53A), per the standard factory service brake circuit installation), and the right rear anti-lock braking system control module (57) is pneumatically connected to each brake assembly of the right rear brake unit (61) through pneumatic lines (54A) and (54B) (typically with line (54B) being pneumatically connected to and branching off from line (54A), per the standard factory service brake circuit installation), wherein the left rear anti-lock braking system control module (55) is pneumatically located between the solenoid operated pneumatic valve and the left rear brake unit (59), and wherein the right rear anti-lock braking system control module (57) is pneumatically located between the solenoid operated pneumatic valve and the right front brake unit (61), as illustrated in FIG. 1 (with other pneumatic components also present between the solenoid valve and the ABS control modules).

In accordance with this automatic braking collision avoidance system of FIG. 1, when air originating at the reservoir (45) is sent through pneumatic line (49) to the solenoid operated valve, this air then flows through pneumatic line (79) to a rear brake 2-way valve (65). Rear brake 2-way valve (65) is pneumatically connected to a rear relay valve (51) through pneumatic line (63), which pneumatic line (63) connects to a rear relay valve input port (67A), such an input stem, of the rear relay valve (51). In operation, air from the rear brake 2-way valve (65) travels along pneumatic line (63) and into rear relay valve (51) through input (67A), and then from rear relay valve (51) the pressurized air is transported through pneumatic line (53) to the rear left ABS control module (55) and through pneumatic line (54) to the rear right ABS control module (57, and then to the left brake assemblies (59) and right brake assemblies (61), respectively as illustrated, causing the brake assemblies to pneumatically engage and the vehicle to slow down and/or stop.

As noted above, this air distribution arrangement from rear relay valve (51) is part of the factory brake design and not unique to the present technology, and while it is typical for many trucks and heavy commercial vehicles, the factory installed brake components of other trucks may vary. This is true for each version of the automatic braking system of this disclosure. For example, air from rear relay valve (51) may be distributed to the rear left side brake components (55, 59) and right rear side brake components (57, 61) using a T-connector rather than separate pneumatic lines (53) and (54), if that is how the brakes are set up by the manufacturer. Further, although the rear pneumatic brakes as shown in FIG. 1 include two left brake assemblies (59 A&B) and two right brake assemblies (61 A&B), there may be only one left brake assembly and one right brake assembly, or there may even be more than two left brake assemblies forming left rear braking unit (59) and more than two right brake assemblies forming right rear brake unit (61). This depends on the number of axles on the vehicle. This is true of all the braking systems (I)-(IV) of this disclosure.

Each wheel of the vehicle must have one brake assembly, and each assembly includes parts that are conventionally known in the art, such as a "brake chamber" that fills with air to engage/apply the brake and which evacuates air to disengage/release the brake, and the "actuation" of the brake assemblies refers to the brake assemblies being operated to effectively engage/disengage (apply the vehicle brakes/release the vehicle brakes) as needed to slow/stop the vehicle and then continue driving. Correspondingly, the "actuation apparatus" is so named because it contains the solenoid valves that allow air to flow to the brake assemblies so that they are engaged when automatic braking is activated, and cuts off the flow of air to the same brake assemblies so that they will disengage when automatic braking is deactivated. FIG. 1 illustrates two brake assemblies for each of the rear left and right sides of the vehicle because it is most common in heavy commercial vehicles, but this is only exemplary and is not intended to be strictly limiting. When a vehicle brake system includes a plurality of brake assemblies at one corner of the vehicle (e.g., rear left corner and/or rear right corner), the assemblies of that corner of the vehicle function together as a unit, i.e., each of the respective assemblies of the unit engage and disengage concurrently. So as illustrated in FIGS. 1-4, in a left rear pneumatic brake unit including two left brake assemblies (59 A&B), both of assemblies (59A&B) will engage and disengage concurrently. Likewise, in a right rear pneumatic brake unit including two right brake assemblies (61A&B), both of assemblies (61A&B) will engage and disengage concurrently, and in the context of the present disclosure, each of the rear brake assemblies will also engage and disengage concurrently with front brake assemblies (41) and (43).

In all of the braking systems (I)-(IV) of this disclosure, in an embodiment where a trailer is attached to the vehicle (which is illustrated in each of FIGS. 1-4 but is optional), air is transported from rear relay valve (51) out of rear relay valve output port (67B), through pneumatic line (70) to trailer pneumatic brake circuit (77) (where "circuit" refers broadly to the trailer foundation brakes and all the pneumatic components required to engage the trailer foundation brakes). Prior to reaching the trailer pneumatic brake circuit (77), the air sent through pneumatic line (70) may optionally first encounter a trailer protection valve (75), which is typically standard on commercial trucks. The trailer protection valve (75) releases air from the pneumatic brake lines of the trailer in the event that the trailer becomes disconnected from the driven vehicle. When that happens, the trailer parking brakes are typically automatically activated. When a trailer is present, the air pressure causing the trailer brakes to be applied will be the same as or approximately the same as the air pressure causing the rear brake assemblies/units to be applied because the same air that flows from the rear relay valve (51) to the rear pneumatic brake units also flows from rear relay valve (51) to the trailer pneumatic brake circuit (77).

Figure 8:
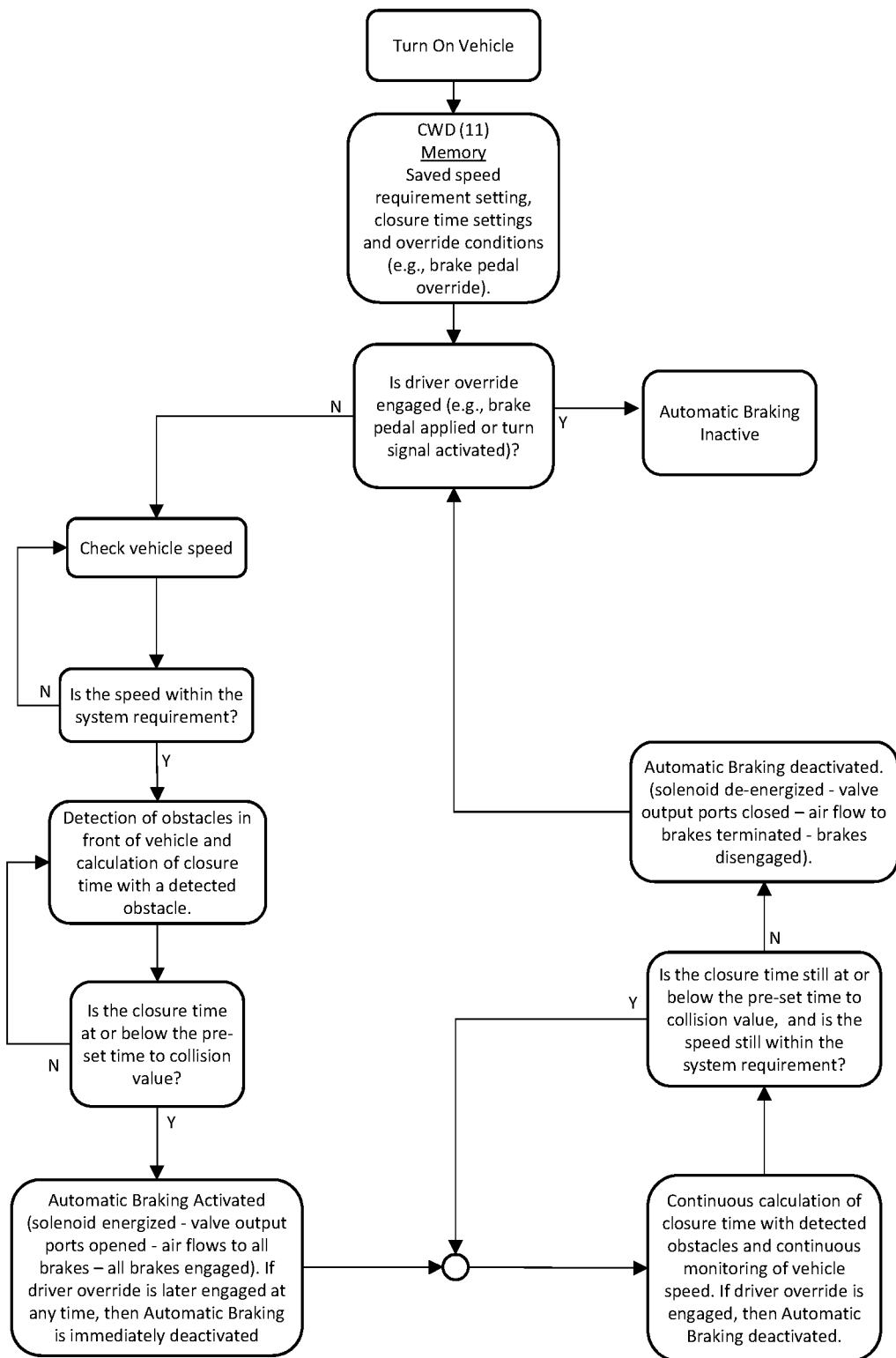
FIG. 8 is a process control diagram illustrating an exemplary programming architecture of a microcontroller for a forward collision avoidance system having a single solenoid valve.

Finally, FIG. 8 illustrates an example of suitable programming architecture of a microcontroller for a forward collision avoidance system of this disclosure including one solenoid valve where the threshold vehicle speed is checked, the presence of obstacles in front of the vehicle is monitored and a closure time is calculated, automatic braking is activated, and automatic braking is deactivated when a driver override is triggered (i.e., the brake pedal is pressed or the turn signal is activated).

II. 360° Collision Avoidance System

The primary difference between the 360° Collision Avoidance system of the automatic braking system and the Forward Collision Avoidance system discussed above is that the automatic braking system is activated when an obstacle is detected in proximity of the body of the driven vehicle (i.e., in proximity of at least one side and/or at least one end of the vehicle) rather than by calculating a closure time with a detected obstacle within a pre-programmed value (or value range) being the factor that triggers activation of the automatic braking system. This detection of the presence of an obstacle in proximity of the vehicle by the collision warning device (11') triggers energizing of the solenoid of the solenoid valve (such as by energizing an electrical contact of the collision warning device (11') that has a wires connected to it, which wire is connected to the solenoid valve, or by energizing a contact of an interface/relay switch/relay that the solenoid valve is wired to either directly or indirectly), causing the solenoid valve to open and activate the automatic brake system.

Additionally, in this 360° Collision Avoidance system, the automatic braking system may operate by pressurizing both the front pneumatic brake assemblies (41 and 43) and the brake assembles of the rear pneumatic brake units (59 and 61), such as illustrated in FIG. 1, or the automatic braking system may operate with only the rear pneumatic brakes being pressurized and without ever pressurizing the front brakes, as illustrated in FIG. 2. In fact, as schematically illustrated in FIGS. 2 and 5B, in the preferred 360° collision avoidance embodiment, if the solenoid valve has a second output port it is preferably plugged and no connections to the front brakes are installed.

There are other differences as well. First, in Forward Collision Avoidance systems I, III and IV of FIGS. 1, 3 and 4, the collision warning device (11) is only used to detect objects in front of the driven vehicle. In the 360° Collision Avoidance system, it is desired to detect objects at least in proximity of the rear end or front end of the driven vehicle, preferably in proximity of one side or both sides of the vehicle as well, and most preferably in proximity to both the front end, the rear end and both the left and right sides of the driven vehicle. In order for the 360° Collision Avoidance system to operate in this manner, the collision warning device (11') must be capable of monitoring for obstacles within the entire periphery of the driven vehicle, or alternatively, one collision warning device (11') must be used for each side or end that is to be monitored. Accordingly, the 360° Collision Avoidance system will incorporate from one collision warning device (11') up to a total of four collision warning devices (11') as part of the system, each device having sensors monitoring the left side, right side, front end and rear end of the driven vehicle for obstacles (typically 1-4 sensors per device). It is also possible to monitor obstacles in the proximity of less than the entire 360° periphery of the driven vehicle, such as left and right sides and the rear end only, or the left and right sides only, or the front end and sides only, or only the left and right sides, etc., wherein the 360° Collision Avoidance system may actually be a 90°, or 180°, or 270° collision avoidance system but will operate in the same way as the 360° Collision Avoidance system but with fewer collision warning devices, i.e., there being one collision warning device per monitored side or end.

When a plurality of collision warning devices (11') are incorporated, the actuation apparatus (13) of the automatic braking system still only incorporates one solenoid operated pneumatic valve AA, such as illustrated in FIG. 5B, and each collision warning device (11') is indirectly wired to and controls energizing/de-energizing of that one solenoid operated pneumatic valve, such as illustrated in FIG. 5B (indirectly wired through intermediate relay (12) and interface/relay switch (14), as discussed in greater detail below). In a preferred embodiment of this 360° Collision Avoidance system, individual electrical wires of each individual collision warning device (11') of the plurality of collision warning devices (11') are connected to each other, most preferably being connected to a first end of a diode. Each diode has two ends and the second ends of the group of diodes are then combined and the combination is connected as a unit to the single solenoid valve. While this configuration of collision warning devices (11') and diodes is preferred for efficiency purposes it is not intended to be strictly limiting and other means for connecting a plurality of collision warning devices (11') to a single solenoid operated pneumatic valve may be used. For example, they may be merged by electrically connecting them to a circuit board via conventional techniques. It is also optional that each collision warning device (11') may be connected to its own individual solenoid operated valve, with each valve optionally having different output port diameters to allow for varying air flow.

Figure 15:
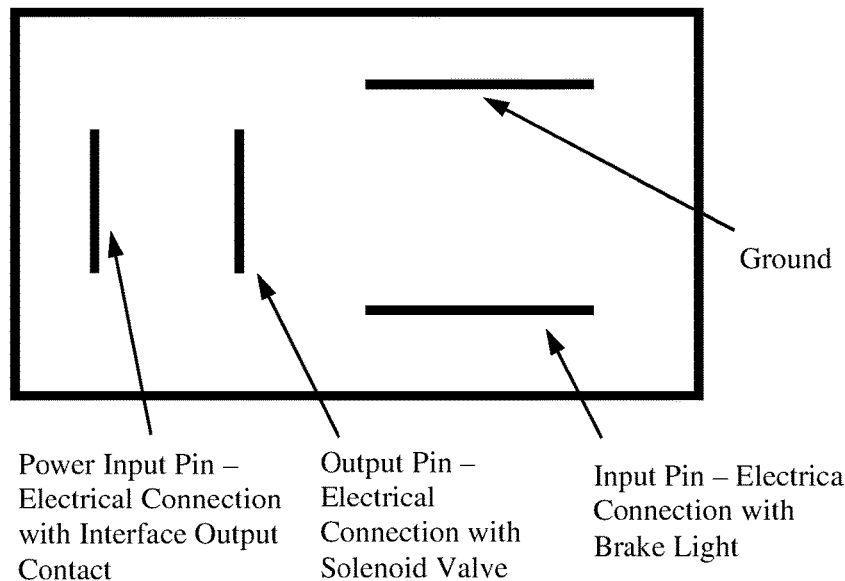
FIG. 15 is a diagram of a 4-pin relay that is used together with an interface in the 360° Collision avoidance system.

In this 360° Collision Avoidance system, as in the Forward Collision Avoidance system described above, the collision warning device (11') is a programmable microcontroller having a memory. However, the type of collision warning devices (11') suitable for detecting the presence of obstacles in proximity to the driven vehicle body according to the 360° Collision Avoidance system may be different than the type of collision warning device used in the Forward Collision Avoidance system since closure time determinations are not needed. Particularly, the collision warning device (11') of the 360° Collision Avoidance system may use radar signals, sonar signals, laser signals (e.g., LIDAR technology) or only optical vision ranging technology to detect the presence of obstacles. Of these, sonar-based, laser-based and optical vision ranging technology systems being most preferred. Each of these types of collision warning device (11') is conventionally known and commercially available. A most preferred optical vision system is the Mobileye® optical vision system commercially available from Mobileye Vision Technologies Ltd. of Israel, which operates to detect the presence of objects with cameras and motion detection software only without using scanning technology such as radar or laser scanning, and thus does not need to transmit and receive signals. A preferred collision warning device (11') having the ability to monitor the entire 360° periphery of the driven vehicle with a single device is BACKEYE®360 system (e.g., models BN360-200 or ASL360-SV) commercially available from Brigade Electronics Inc. of Portland, Ind. Other suitable collision warning devices that provide single side/end coverage are, for example, the BACKSCAN® Ultrasonic Detection System (e.g., model BS-4000 W), the SIDESCAN® Ultrasonic Detection System (e.g., models SS-4100 W or SS-4100 W-000), and the FRONTSCAN® Ultrasonic Detection System (e.g., model FS-4000 W), each of which is also commercially available from Brigade Electronics Inc. All of these devices are programmable with bundled software or conventional commercial programming software using a conventional programming language and using methods that are conventionally known in the art. In some embodiments, as described herein, the proximity sensing collision warning devices (11') may be connected to an intermediate interface, switch (relay switch) or relay, or a combination thereof, rather than being directly connected to the valves of the actuation apparatus (13/13'/13"), particularly if the proximity sensing collision warning device(s) (11') is not capable of generating a 12 Volt signal to energize the solenoid valves. In this regard, a commercially available interface, relay switch or relay such as those disclosed herein will receive a signal from the device (11') that an object is detected, and the interface/switch/relay will recognize that signal and trigger the energizing of the solenoid valve(s). An exemplary embodiment using a combination of an interface and relay is discussed below and illustrated in FIGS. 14 and 15, wherein an interface receives the signal from the device (11') that an obstacle is detected, causing a pin of a relay to be energized, which pin is connected to the solenoid valve(s). In this exemplary embodiment, the relay may have one such pin to be energized or multiple pins which may be triggered to be energized under different conditions. The interface/switch/relay, can be programmed with software as discussed above or adjusted manually using well known means in the art.

In accordance with this disclosure, an obstacle is considered to be "in proximity of" the vehicle if it is within, for example, 60" inches of the vehicle body (from 0 inches to 60 inches). However, this distance is customizable with simple programming of device (11') (programming as discussed above) or manually adjusting depending on the adjustment capabilities of the selected collision warning device(s) (11'), or by adjusting the activation setting of an interface (e.g., speed control interface) instead of the device (11'), as described herein. For example, in one embodiment, the collision warning devices (11') monitoring the left and right sides of the driven vehicle are programmed (or manually adjusted, if capable) to trigger energizing of the solenoid valve if an obstacle is detected within 18 inches (from 0 inches to 18 inches) of the left side and/or the right side of the driven vehicle. Thus, in this embodiment, anything within 18 inches is considered to be "in proximity of" the left side or right side of the driven vehicle. In the same embodiment, the collision warning devices (11') monitoring the front end and rear end of the driven vehicle are programmed (or manually adjusted) to trigger energizing of the solenoid valve if an obstacle is detected within 30 inches (from 0 inches to 30 inches) of the front end and/or the rear end of the driven vehicle. Thus, in this embodiment, anything within 30 inches is considered to be "in proximity of" the front end or the rear end of the driven vehicle. In other embodiments, the "in proximity of" distance may be equal for each of the ends and each of the sides, and may be longer distances, for example, within 10 feet (120 inches) of the vehicle body, as would be decided by the system installer. Typically, the collision warning devices (11') will monitor for obstacles within 60 inches of the vehicle body, with automatic braking being triggered when the obstacle is within a smaller set distance such as 18 inches or 30 inches, with the trigger distance being customizable with programming, such as manually programming an interface as described below, or with an alternative manual adjustment depending on the warning device/interface capabilities.

Next, since the objective of the 360° Collision Avoidance system is to prevent collisions with obstacles in proximity of the driven vehicle, it is important that the maximum or close to maximum braking power be applied as soon as possible once such an obstacle is detected, rather than initiating a slowing down and gradual stopping of the vehicle as preferred in the Forward Collision Avoidance system. Accordingly, rather than utilizing a solenoid operated pneumatic valve having relatively small output port diameters of about 3.0 mm or less, which will cause the gradual pressurization of the front and rear pneumatic brakes, solenoid operated pneumatic valves having larger outlet port diameters of greater than 3.0 mm are used. Preferably each of the outlet ports have a diameter of from about 5.0 mm to about 15.0 mm, and most preferably more preferably from 6.35 mm (¼ inch) to 12.7 (½ inch). When an obstacle is detected by the sensors of the collision warning device (11') mounted at either side or end of the driven vehicle, the solenoid of the solenoid operated pneumatic valve is energized, opening these outlet ports and causing a large flow of air to the brakes (front brake assemblies and rear brake assemblies, or only the rear brake assemblies) which promptly pressurizes the brake assemblies up to the maximum braking pressure of the first air pressure reservoir (45) or the maximum determined by a vehicle regulator, such as 60 psi or greater than 60 psi (70 psi to 120 psi, 80 psi to 120 psi, 90 psi to 120 psi, 100 psi to 120 psi and 110 psi to 120 psi), preferably 120 psi, thereby causing the brake assemblies to immediately or very promptly engage when an obstacle is detected. This maximum braking pressure (e.g., 60 psi to 120 psi, as stated above) is not necessarily the pressure necessary to stop the vehicle or to keep it stopped, but the flow of air from the automatic braking system will increase up to the maximum available brake pressure (as determined by the factory installed air regulator) until the driver presses on the brake pedal (21) or activates a turn signal, or until the object is no longer in proximity to the vehicle body which will cause the solenoid(s) to be de-energized (again, such as by deactivating power to an electrical contact of the collision warning device (11') or to a contact of an interface/relay switch/relay that the solenoid valve is wired to either directly or indirectly), thereby closing the solenoid valve and deactivating automatic braking. It is noted again that the collision warning device (11') of FIG. 2, like collision warning device (11) of FIGS. 1, 3 and 4, is also electrically connected to the CAN Bus and will receive a signal when the brake pedal (21) is pressed and, optionally, when the left or right turn signal (not illustrated) is activated, which triggers the collision warning device (11') to de-energize the solenoid and close the valve. When automatic braking is deactivated and pedal braking is not engaged, air is exhausted out of the system in the same way as discussed above for the Forward Collision Avoidance systems.

Next, while the Forward Collision Avoidance system is intended for use while the vehicle is moving at 10 miles per hour or greater, the 360° Collision Avoidance system operates by detecting obstacles while the driven vehicle is moving slowly in either the forward or reverse directions, for example, at a speed of less than 10 miles/hour Like the proximity distance, this speed setting is preferably customizable by programming the collision warning device (11') or by manually programming an interface (14) (see below), and can be any value (e.g., 0 to 65 miles/hour), but in most instances it is preferred that collision warning devices (11') monitor for obstacles when the vehicle is moving at a speed of from 0 miles/hour to about 5 miles/hour, and most preferably when the vehicle is moving at a speed of from 0 miles/hour to 3 miles/hour. In this regard, if an object is detected when the vehicle is moving above the pre-programmed speed setting (e.g., more than 3 miles/hour), the collision warning devices (11') will not trigger the energizing of the solenoid valve (e.g., by not energizing a contact of an intermediate interface component contact, as described below). This is because if the vehicle is moving faster, the instant high pressurization of the brakes may cause a jarring stop that may injure the driver or vehicle occupants.

Typically, when it is desired for the automatic braking system to be inactive at speeds below 10 miles per hour, a relay switch or a vehicle speed interface needs to be used to determine of the vehicle speed is within the required range for the activation/deactivation of the collision warning devices (11'). Accordingly, in this embodiment having a low speed threshold, rather than programming the collision warning device(s) (11') with a threshold speed setting, it is the interface (or the output pin of the relay switch) that is programmed (or manually programmed/set) to activate upon the vehicle reaching the desired threshold speed setting.

Both a relay and a vehicle speed interface are conventionally known electrical devices that are widely commercially available for use with automobiles. Useful relays include standard 12 volt, multi-purpose, five pin relays, such as those manufactured by Denso Corporation of Kariya, Aichi Prefecture, Japan; Omron Corporation of Kyoto, Japan; Panasonic Industrial Devices of Newark, N.J.; or TE Connectivity of Schaffhausen, Switzerland, and may be purchased on the internet from a range of suppliers. Among useful vehicle speed interfaces, preferred are universal Speedometer Signal Interfaces commercially available from Dakota Digital of Sioux Falls, S. Dak., including their SGI-5 interfaces, with a most preferred interface being their Universal Speedometer Signal Interface SGI-5 E.

In a particularly preferred embodiment for the 360° collision avoidance system (although also similarly useful in each of the other embodiments), such a vehicle speed interface is most preferably electrically connected directly to the vehicle transmission speed sensor (via a wire from the sensor to an electrical input contact of the interface), which sends speed data to the interface in the form of pulses of electricity, as is conventionally known in the art. Alternatively such speed data may be obtained via electrical connection to the speed ECU, or via the CAN Bus, or via any other method that would be understood by one skilled in the art. These pulses of electricity change with the vehicle speed and the interface is programmed so that when the pulses reach a certain level, an electrical output contact of the interface is energized. If using the Universal Speedometer Signal Interface SGI-5 E from Dakota Digital, which is illustrated in FIG. 14 showing its wiring connections, the device includes external buttons ("SET" and "INC," as illustrated) that allow the user to easily manually program the activation or deactivation conditions of each input/output contact without the need for control software.

With particular regard to the connection and operation of the most preferred Universal Speedometer Signal Interface SGI-5 E, the interface (14; see FIG. 2) is powered by being electrically connected to the vehicle ignition (or an alternative vehicle source of 12V power; not illustrated in FIG. 2) with a wire connected from the power source to the "Power" contact of the interface. The collision warning device(s) (11') is/are similarly powered by an electrical connection to the vehicle ignition (or other vehicle source of 12V power).

Another wire electrically connects the transmission speed sensor (or a similarly functioning alternative source of speed information) to the "Signal In" contact of the interface. This transmits pulses to the "Signal In" contact, with the pulse rate corresponding to the vehicle speed (e.g., in miles per hour). If the pulses correspond to a speed within the manually set auto-brake active speed (e.g., 0-3 miles per hour), then the "Sensor Power" input contact of the interface is energized (activated/active). If the pulses correspond to a speed outside the manually set auto-brake active speed (e.g., above 3 miles/hour), then the "Sensor Power" contact is not energized (not activated/not active).

Next, the jointly connected collision warning devices (11') ((as joined together with a diode as discussed herein, or by a circuit board) are jointly electrically connected to the interface (14) with a wire to the "Sensor Power" contact. The sensors of the device(s) (11') normally continuously monitor for the presence of obstacles as long as the devices are powered. This monitoring for obstacles is typically within a broad distance of about 60 inches (5 feet). When an obstacle is detected within that broad distance, pulses are sent to the "Sensor Power" contact of the interface at a rate that corresponds to how close the obstacle is to the vehicle. The closer the obstacle is to the vehicle, the faster the pulse rate will be.

If the "Sensor Power" contact is active (e.g., the vehicle speed is within 0-3 miles/hour), then the interface will recognize the pulses sent by the collision warning device(s) (11'). If the "Sensor Power" contact is not active, the pulses are still sent by the collision warning device(s) (11') but they will not be recognized by the interface.

When a detected obstacle is detected within the set proximity of the vehicle that indicates a risk of collision (e.g., 18 inches), the pulse rate becomes fast enough that the interface triggers the energizing of all its output contacts (calibrated with varying pulse per mile (ppm) settings). This describes the basic functioning of the interface, and the output energy of those contacts may be used for any desired purpose.

In accordance with this disclosure, the driver is equipped with the ability to automatically terminate automatic braking by pressing the brake pedal, and optionally also by activating the turn signals. To enable these features to function, a relay is electrically connected to one of the output contacts of the interface (connected to any of the out contacts; will be calibrated to the specific vehicle power settings). Again, a relay is a conventional electrical component and is widely commercially available from any of the above-mentioned commercial sources, e.g., Denso Corporation. A relay that is connected to an interface such as the SGI-5 E preferably has at least four pins, such as a conventional four pin relay illustrated in FIG. 15, but it can have additional pins (e.g., may be a five pin relay). The solenoid valves within the actuation apparatus (e.g., valve (AA) of apparatus (13)) are then connected to an output pin of this relay. This allows automatic braking to be easily deactivated by controlling the energy flow within the relay.

In this regard, a power input pin of the relay is electrically connected to one of the output contacts of the interface, thereby energizing the relay if the interface output contacts are energized. The solenoid valve is then connected to an output pin of the relay that is energized when the relay is energized, and when that output pin is energized the solenoid valves are energized and thus are open and automatic braking is active. Separately, an input pin (different than the power input pin) is connected to one of the vehicle brake lights. When the brake pedal (21) is pressed, the brake lights are activated, which correspondingly transmits an electrical signal to this input pin of the relay and causing it to be energized. When this input pin of the relay is energized, the output pin correspondingly is deactivated, which causes the solenoid of the solenoid valve to be de-energized, thereby closing the solenoid valve and deactivating automatic braking (or preventing activation of automatic braking if not previously activated). In an optional embodiment another wire connected to the turn signal light may be spliced (electrically connected, optionally with another diode) with the wire that is connected to the brake light, allowing the deactivation of the solenoid valve when the turn signal is activated (or preventing activation of automatic braking if not previously activated).

Next, as noted above, since the 360° Collision Avoidance system operates when the driven vehicle is moving at a relatively low speed, the system can stop the vehicle by only pressurizing the rear brake assemblies/units rather than having to pressurize the front brake assemblies as well as required with the Front Collision Avoidance System. An embodiment that pressurizes only the rear pneumatic brakes is illustrated in FIG. 2. As illustrated in FIG. 2, this automatic braking embodiment will operate the rear brake assemblies/units in the same way as described above for the Forward Collision Avoidance system of FIG. 1, transporting air that originates in first air pressure reservoir (45), through pneumatic line (49), through the solenoid operated pneumatic valve within actuation apparatus (13), through pneumatic line (79) and rear brake 2-way valve (65) and to rear relay valve (51) via pneumatic line (63) and through rear relay valve input (67A), with rear relay valve (51) distributing the air flow to the anti-lock brake modules (55) and (57) via pneumatic lines (53) and (54), respectively, and then to left rear brake assemblies (59A) and (59B) through pneumatic lines (53A) and (53B), respectively (again, typically with line (53B) being pneumatically connected to and branching off from line (53A)), as well as to right rear brake assemblies (61A) and (61B) through pneumatic lines (54A) and (54B), respectively (again, typically with line (54B) being pneumatically connected to and branching off from line (54A)). As illustrated, air may also be sent to activate the brakes of an optionally attached trailer, just as discussed above for the Forward Collision Avoidance system. After braking is deactivated, air is exhausted out of the system in the same way as discussed above for the Forward Collision Avoidance systems.

Figure 9:
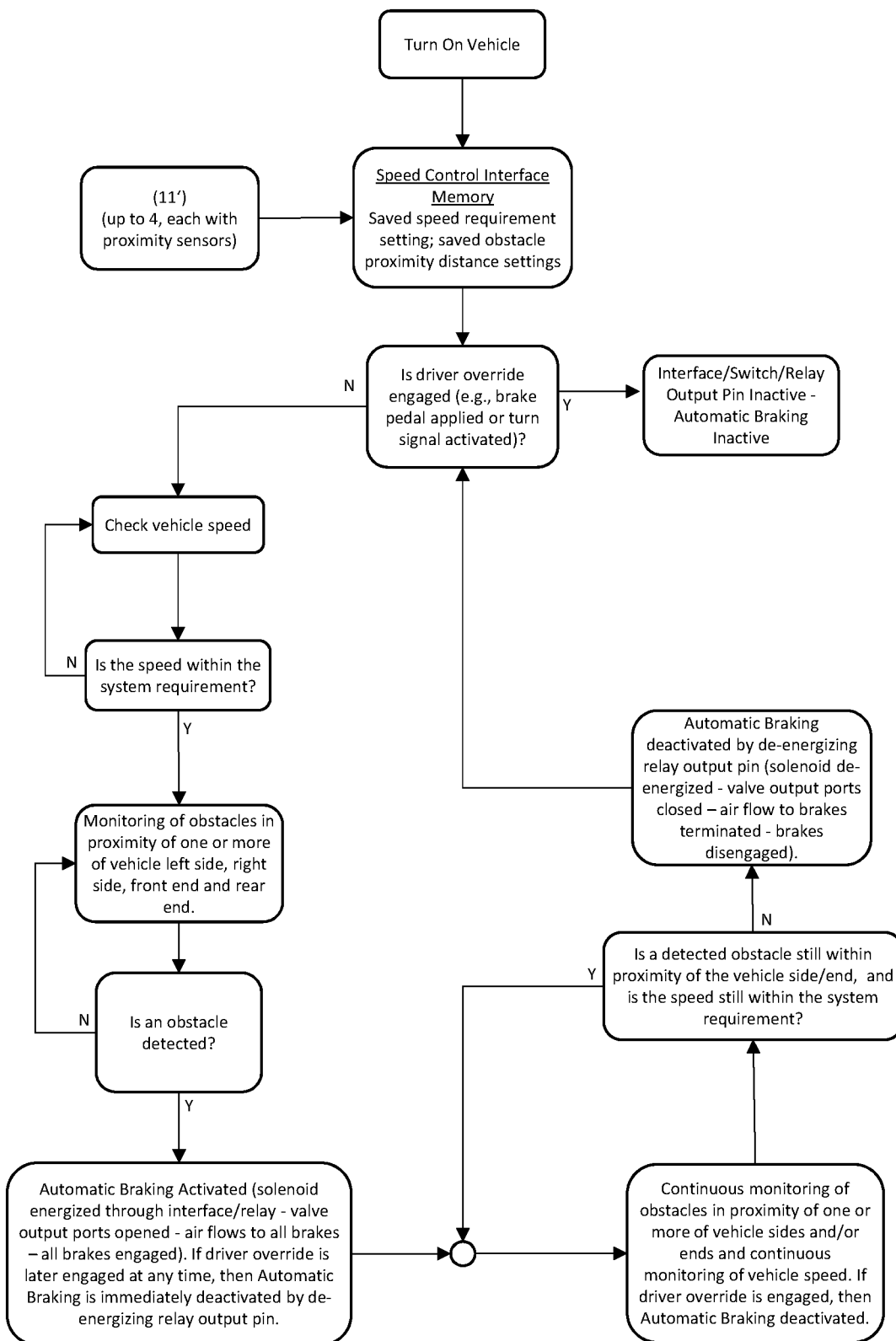
FIG. 9 is a process control diagram illustrating an exemplary programming architecture of a microcontroller for a 360° collision avoidance system.

Finally, FIG. 9 illustrates an example of suitable programming architecture of a microcontroller for a 360° Collision Avoidance system of this disclosure where the threshold vehicle speed is checked, the presence of obstacles in proximity of the vehicle is monitored, automatic braking is activated, and automatic braking is deactivated when a driver override is triggered (i.e., the brake pedal is pressed or the turn signal is activated).

III. Single-Stage Braking Forward Collision Avoidance System with Individual Brake Control The third version (III) of the automatic braking collision avoidance system, illustrated in FIG. 3, is another Forward Collision Avoidance system like the embodiment (I) of FIG. 1. However, in this version (III) the driven vehicle has an electrical-pneumatic braking system that is equipped for individual brake control of front brake assemblies (41) and (43) and rear brake units (59) and (61) individually and independently of each other, i.e., four separate braking operations with the front left (41), front right (43), rear left ((59) as a unit of two, as illustrated) and rear right ((61) as a unit of two, as illustrated) brake assemblies each being controlled independently of one another. To effectuate this single-stage automatic braking system (III) with such independent brake assembly/brake unit control, each brake assembly/brake unit is electrically paired with its own solenoid operated pneumatic valve ((A), (B), (C) or (D)) within actuation apparatus (13'), as illustrated in FIG. 6. This system (III) of FIG. 3 likewise operates with a collision warning system (11) that utilizes camera-based (optical vision) ranging technology, or radar based ranging technology, or laser based ranging technology, or a combination thereof, to continuously monitor for the presence of obstacles in front of the driven vehicle and calculate a closure time with said obstacles in order to avoid or mitigate collision impacts of a driven vehicle with obstacles, and as with the first version (I), any other type of technology capable of detecting the presence of foregoing obstacles and calculating a closure time with the obstacles is also acceptable even if it does not function by transmitting and receiving signals. As previously described, to calculate the closure time, the collision warning device (11) uses speed data (obtained as discussed above) together with the determined distance between the driven vehicle and the detected foregoing obstacle.

In a conventional, factory installed electrical-pneumatic braking system that is equipped for individual brake control of the front brake assemblies (41) and (43) and rear brake assemblies (59A) and (59B) of unit (59) and (61A) and (61B) of unit (61), such as illustrated in FIG. 3, the brake assemblies/units are individually pneumatically connected with a single anti-lock braking module ((37), (39), (55), (57)). Each of said anti-lock braking modules is pneumatically connected to a single brake assembly/brake unit, allowing for individual brake control independent the other brake assemblies/brake units (i.e., front left module (37) is pneumatically paired with front left brake assembly (41); front right module (39) is pneumatically paired with front right brake assembly (43); rear left module (55) is pneumatically paired with the brake assemblies of rear left brake unit (59); rear right module (39) is pneumatically paired with the brake assemblies of rear right brake unit (61)), with the pneumatic location of the components being as illustrated in FIG. 3). As is conventionally known in the art, each vehicle wheel is also equipped with a sensor that is electrically connected to a standard brake electronic control unit ("Brake ECU") of the vehicle. The Brake ECU is also electrically connected to each anti-lock brake module. As per the standard manufacturer installed brake system, the wheel sensors detect brake locking, and when a brake locks up the sensor electrically communicates that information to the Brake ECU which triggers the ABS control module to pulse air to the brakes (in the normal way that an ABS control module functions).

In a conventional braking system, the Brake ECU is considered to be part of the CAN Bus system or is in electronic communication with the CAN Bus system, so when the Brake ECU receives a signal from the wheel sensor that a wheel has locked, that information is available to any other component connected to the CAN Bus. This includes the collision warning device (11) which is electrically connected to the Brake ECU with four separate wired electrical connections, one electrical connection being paired with each brake assembly/brake unit. These electrical connections between the collision warning device (11) and the Brake ECU may be direct or indirect (e.g., collision warning device wires may be spliced into other wires that are directly connected to the Brake ECU). In the accordance with this third version (III) of the automatic braking system, if automatic braking is active and the wheel sensor detects that a wheel has locked, that signal is then transmitted through from the Brake ECU to the collision warning device (11) through the electrical connections, e.g., through the CAN Bus. The collision warning device (11) as illustrated in FIG. 6 also has separate electrical connections ((15A), (15B), (15C), (15D)) to each of the four solenoid valves located in actuation apparatus (13'), with one wired electrical connection from each brake assembly/brake unit being paired to one particular solenoid valve within apparatus (13'). So the collision warning device (11) is an intermediary between the Brake ECU and the four solenoid valves of actuation apparatus (13'). This allows the collision warning device to individually de-energize and close the solenoid valve that is electrically connected to the locked wheel, thereby deactivating automatic braking for that brake assembly/brake unit only, without affecting the brake assemblies of wheels that are not locked (except that if only one brake assembly with a multi-assembly brake unit is locked, automatic braking is de-activated for all brake assemblies within the entire brake unit). This individualized de-energizing is accomplished by programming the collision warning device (11) to cut off the energy flow along the wire to the solenoid valve that is paired with the locked wheel. This programming can be accomplished as described above for the other systems, for example, by programming the collision warning device with software that is bundled with the collision warning device by its manufacturer, as discussed herein, such as by programming an electrical contact on the device (11) to which solenoid valves are wired to be powered on or powered off upon receiving the signal from the Brake ECU. Or, an electrical interface/switch/relay (or combination thereof) may optionally be used to cut off power along the wire going to the solenoid valve when the signal is received from the Brake ECU (e.g., directly or through the CAN Bus). Once the wheel is no longer locked, the collision warning device will once again be capable of energizing that brake assembly/unit if automatic braking is activated by the presence of an obstacle within the set closure time while the vehicle is moving above the threshold speed. This contrasts with the Forward Collision Avoidance (I) system of FIG. 1 which uses one solenoid operated valve and accordingly the locking of a single brake in system (I) will result in the entire automatic braking system being deactivated due to the de-energizing of the solenoid of said one solenoid valve (AA).

As with the one solenoid valve single-stage Forward Collision Avoidance System (I), the four solenoid valve Forward Collision Avoidance System (III) with individual brake control uses any commercially available collision warning device (11), the same as described above for the system (I) of FIG. 1, to continuously monitor the presence of obstacles in front of the driven vehicle, to continuously calculate a closure time of the driven vehicle with detected foregoing obstacles, to energize the solenoids when said closure time is at or below a pre-set time to collision value, and to keep the solenoids energized until said closure time is above said pre-set time to collision value. In addition to the incorporation of four solenoid valves (A, B, C and D) within actuation apparatus (13') and the components needed for the electrical and pneumatic integration of said solenoid valves within actuation apparatus (13'), and the necessary electrical connections for the solenoid valves with collision warning device (11) and with the Brake ECU, systems (I) and (III) also differ in the pneumatic components (i.e., pneumatic hoses and valves) necessary for the integration of the actuation apparatus as a whole into the factory installed electronic braking system to allow for individual control of the four brake assemblies/brake units of the vehicle.

In this regard, rather than a single front brake 2-way valve (17) as found in FIG. 1, the system of FIG. 3 instead incorporates two front brake 2-way valves (17A) and (17B), wherein valve (17A) is pneumatically connected to the actuation apparatus (13') via pneumatic line (hose) (19A), to front connector gate (36) through pneumatic line (40A'), and to ABS module (37) through pneumatic line (40E). Valve (17B) is pneumatically connected to the actuation apparatus (13') via pneumatic line (hose) (19B), to front connector gate (36) through pneumatic line (40B'), and to ABS module (39) through pneumatic line (40F). Like FIG. 1, in this version (III), front left ABS module (37) is pneumatically connected to front left brake assembly (41) through pneumatic line (40C) and front right ABS module (39) is pneumatically connected to front right brake assembly (43) through pneumatic line (40D). Analogous to the system of FIG. 1, front brake 2-way valves (17A) and (17B) are components of the automatic braking collision avoidance system of this disclosure and are not standard factory braking system components.

With respect to the rear brake assemblies/units, unlike to the system of FIG. 1 which sends air being directed to the rear brake assemblies/units (59) and (61) first through a rear relay valve (51) (for both pedal braking and automatic braking, as illustrated), in the automatic braking system (III) of FIG. 3, air being sent to rear brake units (59) and (61) from actuation apparatus (13') bypasses rear relay valve (51) and instead is transported directly to two rear relay valves, (51A) and (51B) before reaching the ABS control modules and then the brake assemblies. Air being sent from actuation apparatus (13') to the rear right corner of the vehicle to reach brake unit (61) is first sent through pneumatic line (79B) directly to valve (51B), and then to right rear ABS module (57) via pneumatic line (54C), then to each of the right rear brake assemblies (61 A/B) via pneumatic lines (54A) and (54B). As illustrated, line (54B) preferably connects directly to line (54A), but this may vary as determined by one skilled in the art, for example, by having both pneumatic lines (54A) and (54B) both connecting directly to ABS module (57).

On the left side of the vehicle, air being sent from actuation apparatus (13') to the rear left corner of the vehicle to reach brake unit (59) is first sent through pneumatic line (79A) directly to rear relay valve (51A) and then to left rear ABS module (55) via pneumatic line (53C), then each of the left rear brake assemblies (59 A/B) via pneumatic lines (53A) and (53B). In contrast to the system of FIG. 1, actuation apparatus (13') is not connected to rear brake 2-way valve (65). Additionally, as illustrated, line (53B) preferably connects directly to line (53A), but this may vary as determined by one skilled in the art, for example, by having both pneumatic lines (53A) and (53B) both connecting directly to ABS module (55).

In this system of FIG. 3, the air in the rear brake assemblies/hoses is still exhausted out of rear relay valve (51) once the automatic braking system is deactivated or once brake pedal (21) is lifted, each of which opens an exhaust port in valve (51). Air in the rear right pneumatic lines flows back through rear relay valve (51B) and through pneumatic line (54') and then through to valve (51), being exhausted out of valve (51). Air in the left right pneumatic lines flows back through rear relay valve (51A) and through pneumatic line (53') and then through to valve (51), being exhausted out of valve (51).

Similar to system (I), the rear relay valve (51) in the FIG. 3 system is still pneumatically connected to rear brake control valve (23), allowing for brake pedal control over the brakes. Specifically, concurrent brake pedal pressurizing of the rear brake units (59) and (61) is accomplished by:

A) Right rear brake unit (61): pressing of the brake pedal (21) sends air supplied by reservoir (45) through pneumatic hose (44), through rear brake control valve (23), through pneumatic hose (52), through valve (51), through pneumatic hose (54'), through valve (51B), through pneumatic hose (54C) and anti-lock brake module (57) and to brake unit (61) via pneumatic hoses (54A) and (54B), as illustrated.

B) Left rear brake unit (59): pressing of the brake pedal (21) sends air supplied by reservoir (45) through pneumatic hose (44), through rear brake control valve (23), through pneumatic hose (71), through valve (73) (which is part of the standard factory service braking system of the vehicle), through pneumatic hose (72) and into valve (51) through input port (67A), then through pneumatic hose (53'), through valve (51A), through pneumatic hose (53C) and anti-lock brake module (55) and to brake unit (59) via pneumatic hoses (53A) and (53B). In contrast with the system of FIG. 1, in this embodiment rear brake 2-way valve (65) (not illustrated in FIG. 3) is bypassed or may optionally be present in line (72) between gate (73) and valve (51). If present in this embodiment, valve (65) is not connected to the pneumatic lines of the automatic braking system and only aids in distributing air from pedal braking, similar to the use of gate (73) in this embodiment.

It should further be understood that the pneumatic components transporting air to the rear left brake unit (59) and rear right brake unit (61) from actuation apparatus 13' of FIG. 3 or from valve (23) during pedal braking may be swapped without altering the novel and unique features of this disclosure. For example, the pneumatic connections may be rearranged so that air from line (72') may be distributed to right rear brake unit (61) rather than left rear brake unit (59), and the pneumatic connections may be rearranged so that air from line (52) may be distributed to left rear brake unit (59) rather than right rear brake unit (61). Similarly, the pneumatic connections of the automatic braking system of FIG. 3 may be rearranged so that pneumatic line (79A) is connected to valve (51B) rather than (51A), and pneumatic line (79B) may be connected to valve (51A) rather than (51B).

As for pedal braking of the front brakes, pressing of pedal (21) releases air originating at air reservoir (29) through pneumatic hose (31), through valve (25), through line (81') to valve (36). Then from valve (36) the air is concurrently distributed to the left front brake assembly (41) (i.e., from valve (36) through pneumatic hose (40A'), through valve (17A), through pneumatic hose (40E), through anti-lock brake module (37) and through pneumatic hose (40C) to brake assembly (41)), and to the right front brake assembly (43) (i.e., from valve (36) through pneumatic hose (40B'), through valve (17B), through pneumatic hose (40F), through anti-lock brake module (39) and through pneumatic hose (40D) to brake assembly (43)).

In both automatic braking and brake pedal actuation of the service brakes, the pressurization of all of rear brake assembles (59 A/B) and (61 A/B) and front brake assemblies (41) and (43) occurs concurrently with each other, as is also true with the single-stage Forward Collision Warning system of FIG. 1. Additionally, as with systems (I) and (II), brake pedal control will always override the automatic braking system of FIG. 3 and will be deactivated in the same way as described for system (I). In this regard, as with system (I), the collision warning device (11) is connected to the CAN Bus system and the signal generated from depressing the brake pedal (21) and optionally from activating the turn signals or from an ABS module upon the locking of a brake assembly, triggers the collision warning device to deactivate automatic braking of the brake assembly (assemblies). Importantly, even though activation of the automatic braking system will concurrently pressurize all of the front and rear brake assemblies, and even though automatic braking of a locked brake may be deactivated individually without deactivating the other non-locked brakes, pressing the brake pedal (21) (or activating the turn signals or a change in the closure time calculation to a non-collision condition) will deactivate all of the solenoids of system (III) concurrently.

Figure 10:
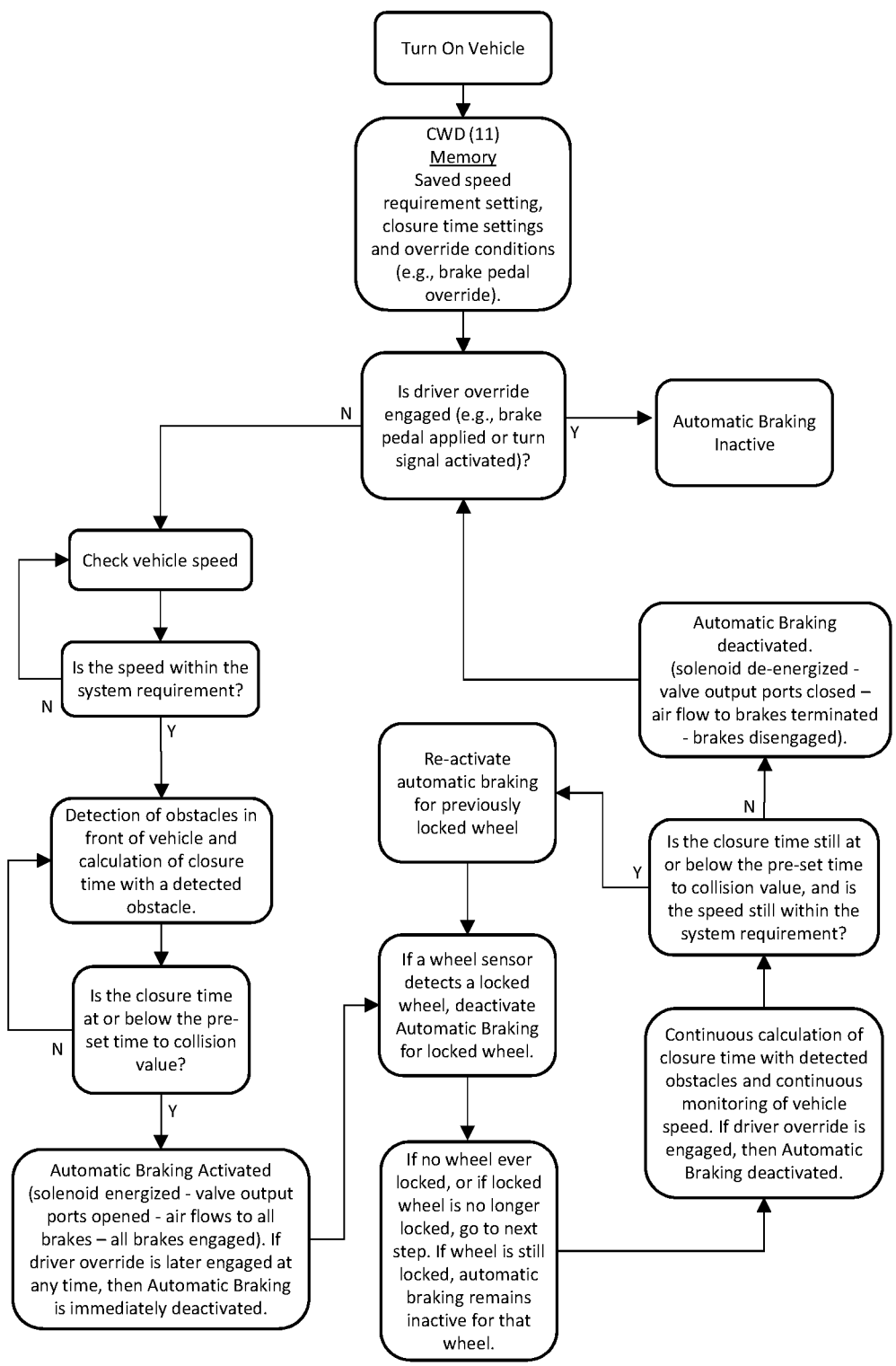
FIG. 10 is a process control diagram illustrating an exemplary programming architecture of a microcontroller for forward collision avoidance system with single-stage braking having four solenoid valves and individual brake/brake unit braking control.

Finally, FIG. 10 illustrates an example of suitable programming architecture of a microcontroller for a forward collision avoidance system of this disclosure including four solenoid valves where the threshold vehicle speed is checked, the presence of obstacles in front of the vehicle is monitored and a closure time is calculated, automatic braking is activated, and automatic braking is deactivated when a driver override is triggered (i.e., the brake pedal is pressed or the turn signal is activated).

IV. Multi-Stage Braking Forward Collision Avoidance System without Individual Brake Control The fourth version (IV) of the automatic braking collision avoidance system is also another Forward Collision Avoidance system like system version (I) of FIG. 1 and system version (III) of FIG. 3. Like systems (I) and (III), system (IV) likewise operates with a collision warning system (11) that utilizes camera-based (optical vision) ranging technology, or radar based ranging technology, or laser based ranging technology, or a combination thereof, to continuously monitor for the presence of obstacles in front of the driven vehicle and calculate a closure time with said obstacles in order to avoid or mitigate collision impacts of a driven vehicle with obstacles, and as with the first version (I), any other type of technology capable of detecting the presence of foregoing obstacles and calculating a closure time with the obstacles is also acceptable even if it does not function by transmitting and receiving signals. However, system (IV) is a multi-stage braking system as described above.

As with system (III), the four solenoid valve Multi-Stage Forward Collision Avoidance System without individual brake control system (IV), illustrated in FIG. 4, uses any commercially available collision warning device (11), the same as described above for the system (I), to continuously monitor the presence of obstacles in front of the driven vehicle, to continuously calculate a closure time of the driven vehicle with detected foregoing obstacles, to energize the solenoids when said closure time is at or below a pre-set time to collision value, and to keep the solenoids energized until said closure time is above said pre-set time to collision value. Accordingly, the useful and preferred collision warning devices (11) for this system are the same as for versions (I) and (III). However, the collision warning device (11) is set up differently in order to operate each of the solenoid valves (A'), (B'), (C') and (D') of actuation apparatus (13") in sequence rather than in unison as in the single phase braking system of FIG. 3. Air flow to all of the front and rear brake assemblies (and to the tractor, if present) is still concurrent/in unison. In this regard, each of solenoid valves (A'), (B'), (C') and (D') is provided with or machined to have output ports of different diameters relative to each other. The size of the output port diameter of each solenoid valve controls the amount of output air flow that flows into the automatic braking system from the respective solenoid valves, with larger diameter ports allowing a greater air flow than smaller diameter output ports. A greater air flow to the brakes results in the brakes becoming fully pressurized sooner, and thus the vehicle braking faster, compared to a lesser air flow which more gradually increases the pressure on the brake assemblies and thus requires a longer time for the brakes to fully pressurize for maximum braking power.

The diameters of the solenoid valve output ports range from about 0.5 mm to about 3.0 mm, but no two solenoid valves should have the same output port diameters, otherwise that solenoid valve would not affect the multi-stage braking performance. As noted above, each successive solenoid valve (A'→B'→C'→D') is designed to allow for increasing amounts of air flow as the calculated closure time decreases. Accordingly, valve (A') will have the smallest output port diameter, followed by valve (B') having the next largest, then valve (C') has the next largest and then valve (D') has the largest output port diameter of the four valves. Accordingly, the system is also set-up so that valve (A') is activated first, then valve (B') is activated, then valve (C') is activated and then finally valve (D') is activated. As the next solenoid valve is opened, the other previously opened valve(s) remain open. In the preferred embodiments, valve (A') (either as purchased or as custom machined) will have an output port diameter of from about 0.5 mm to about 0.75 mm; valve (B') has a preferred output port diameter of from about 0.75 mm to about 1.0 mm; valve (C') has a preferred output port diameter of from about 1.0 mm to about 2.0 mm; valve (D') has a preferred output port diameter of greater than 2.0 mm, preferably from about 2.0 mm to about 3.0 mm, or wider. Despite an overlap in these preferred ranges, no two valves should have the same diameter, i.e., (A') output port diameter<(B') output port diameter<(C') output port diameter<(D') output port diameter. So if the output port diameter of (A') is 0.75 mm, the output port diameter of (B') is not 0.75 mm even though that's the range minimum.

In this regard, in a most preferred embodiment of the disclosure, the output port diameter of (A') is 0.75 mm, the output port diameter of (B') is 1.0 mm, the output port diameter of (C') is 2.0 mm, and the output port diameter of (D') is 3.0 mm. Each of these port diameters can be calculated to correlate to a certain air pressure passing through the output ports with air as provided from the first air reservoir (45), with the air reservoir being filled with a standard air compressor that is original to the vehicle, up to a max air pressure setting of the compressor (or as set by an air regulator, if present). In this regard, a 0.75 mm output port diameter equates to an output air pressure of about 30 psi, a 1.0 mm output port diameter equates to an output air pressure of about 40 psi, a 2.0 mm output port diameter equates to an output air pressure of about 50 psi, and a 3.0 mm output port diameter equates to an output air pressure of about 60 psi, with further pressure increases as the diameter size increases above 3.0 mm, with the air pressure being sent to all of the front and rear brake assemblies concurrently. However, as each of the port diameters is customizable, the actual brake pressure on the brakes when each solenoid valve opens will vary.

Each of solenoid valves (A'), (B'), (C') and (D') within apparatus (13") is electrically connected to and energized/activated by the collision warning device (11) just as the apparatuses of the other forward collision avoidance systems (I) and (III). The collision warning device (11) is programmed/configured to trigger the valves in sequence based on the detection of an obstacle and the calculated closure time with the obstacle. In a preferred embodiment, collision warning device (11) is programmed to energize solenoid valve (A') when the closure time with the obstacle is at approximately 0.6 seconds. Valve (B') is then energized/opened once this closure time is reduced to or at 0.5 seconds (with valve (A') remaining open). Valve (C') is then energized/opened once this closure time is reduced to or at 0.4 seconds (with valves (A') and (B') remaining open). Valve (D') is then energized/opened once this closure time is reduced to or at 0.3 seconds or less (with valves (A'), (B') and (C') all remaining open). The opening of each successive solenoid valve is a new braking stage, hence multi-stage braking. When only valve (A') is open, the air flow to the brakes (front and rear concurrently) applies a relatively low air pressure, similar to when a driver lightly touches the brake pedal. When valve (B') opens, the brakes are applied a little bit stronger, similar to the driver pressing the brake pedal a little harder. When valve (C') opens, the air flow is increased again, slowing down the driven vehicle even more. Finally, the opening of valve (D') is equivalent to applying the pedal brake at full force.

In some instances, multiple solenoid valves may open simultaneously. In this regard, the closure time calculated by collision warning device (11) will reduce as the distance between the driven vehicle and the detected obstacle is shortened. In the even that an obstacle is not first detected until a time when calculated closure time is less than 0.6 seconds, then multiple solenoid valves may be simultaneously energized and opened. For example, if a foregoing vehicle or person were to dart in front of the driven vehicle causing the collision warning device (11) to initially calculate a closure time 0.3 seconds or less, then all four of solenoid valves (A'), (B') and (C') and (D') will open simultaneously, sending the max pressure available (analogous to applying the brake pedal (21) at full force) to the front and rear brake assemblies concurrently. Finally, as the collision threat is reduced by the calculated time to collision growing larger, all valves will remain open until the collision threat is considered gone (e.g., time to collision is more than 1.0 seconds) rather than the valves closing sequentially as the threat is reduced.

In order for the multi-stage forward collision braking system to perform as just described, each solenoid valve must be individually electrically connected to the collision warning device (11) (either directly or indirectly) with a separate wire/electrical connection, and the collision warning device (11) is set to energize the wires in the desired sequence depending on the closure time calculation. Depending on the particular collision warning device used, the device (11) itself is programmed or an intermediate device such as an interface or switch/relay (e.g., a control relay, such as a power control relay) that is connected to the collision warning device (11) is programmed. Such "programming" may be manual, such as by manually adjusting the collision warning device or manually adjusting the interface or switch/relay if present, such as with programming buttons such as illustrated in FIG. 14, or by turning an adjustment screw if that is how the device/interface/switch/relay operates.

Preferably, each wire that is connected to each individual solenoid valve is separately directly connected to the collision warning device (11) which is programmed (e.g., with bundled control software) to trigger energizing of each particular valve when the calculated closure time reaches a certain, pre-set threshold level such as those discussed above, such as by programming electrical contacts of the collision warning device (11) to which the solenoid valves are wired to be powered on or powered off, thereby controlling if the solenoid valves are energized or de-energized. Alternately, each wire connected to each solenoid valve may be indirectly connected to the collision warning device (11) via an interface, switch, relay or a combination thereof.

Additionally, as with each of the other embodiments of this disclosure, the multi-stage automatic braking system is designed to be automatically deactivated if the brake pedal (21) is pressed by the driver, and optionally if either of the turn signals are activated. In this regard, either action (pressing the brake pedal (21) and activating the turn signals) will generate a signal that is sent through the CAN Bus (or, alternatively, directly to the collision warning device (11) or to an interface/switch/relay that is/are electrically connected to the solenoid valves, the brake lights/turn signal lights such as described for the 360° system), and either the collision warning device (11) itself will be deactivated or contacts of the device (11) to which the solenoid valves are electrically connected to, or the wires connected to the solenoid valves will be de-energized in other ways, such as by deactivating energizing contacts of an interface/switch/ relay that they are attached to, in the same manner as discussed for the other forward collision warning systems (I) and (III) above.

Figure 11:
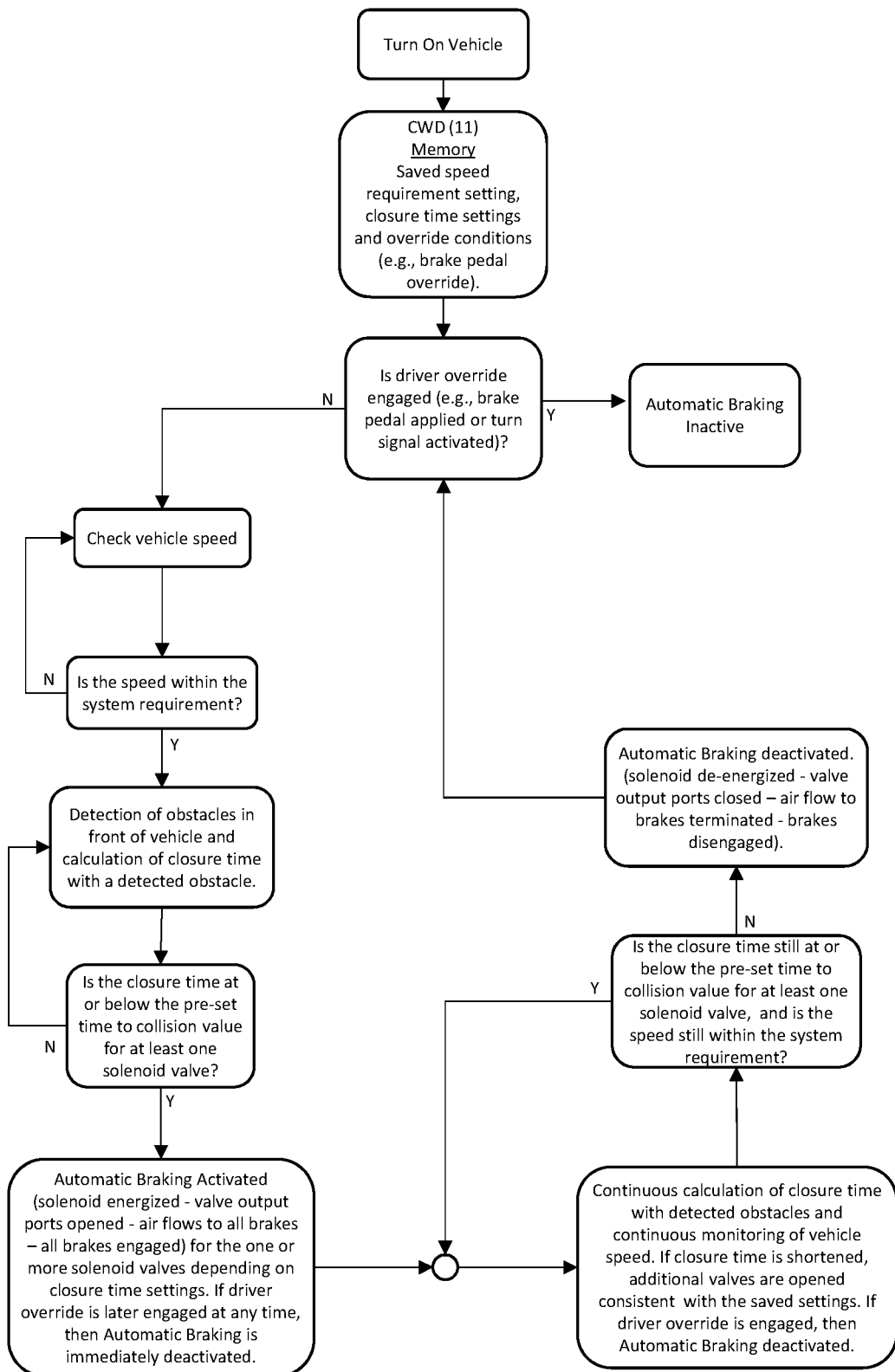
FIG. 11 is a process control diagram illustrating an exemplary programming architecture of a microcontroller for forward collision avoidance system with multi-stage braking having four solenoid valves and individual brake/brake unit braking control.

FIG. 11 illustrates an example of suitable programming architecture of a microcontroller (i.e., the collision warning device) for the multi-stage forward collision avoidance system of this disclosure including four solenoid valves where the threshold vehicle speed is checked, the presence of obstacles in front of the vehicle is monitored and a closure time is calculated, automatic braking is activated, and automatic braking is deactivated when a driver override is triggered (i.e., the brake pedal is pressed or the turn signal is activated). While the present disclosure has been particularly shown and described with reference to preferred embodiments, it will be readily appreciated by those of ordinary skill in the art that various changes and modifications may be made without departing from the spirit and scope of the disclosure. For example, in all embodiments of this disclosure, rather than the solenoid valves having two different output ports, there can be a single output port with two pneumatic lines/hoses branching off from it and directing air to the front and rear brakes concurrently, such as by using an air manifold or Y-connector. Similarly, in an embodiment having a four solenoid valve actuation apparatus (13)' or (13"), such as illustrated in FIGS. 6 and 7, air going into the actuation apparatus (13')/(13") may be distributed with an air manifold rather than multiple hoses or a single hose having multiple output connections to each of valves (A/A'), (B/B'), (C/C') and (D/D'). In this type of embodiment, hose (49) as illustrated in FIGS. 6 and 7 would preferably terminate at the edge of the actuation apparatus (13')/(13") and pneumatically connect to the internal air manifold via a proper pneumatic connection/hose/fitting, and additional pneumatic connections/hoses/fittings would allow for the distribution of air to each of the solenoid valves. And as noted above, the hoses directing air to the left and right sides of the front and/or rear brake assemblies may be switched without changing the operation of the automatic braking system. Further, the interface device that is used in the preferred system set-up of the 360° automatic braking system may also be used for all of the forward collision systems as well, with the wired connections being similar or the same and allowing for deactivation of automatic braking by pressing the brake pedal (21) and also optionally by activating the turn signals. When an interface is used, the collision warning device(s) (11/11') are not directly electrically connected to the solenoid valves within the actuation apparatus (13/13'/13"), but rather the interface and relay as discussed above are intermediate devices between the collision warning device(s) and the actuation apparatus such as illustrated in FIG. 2, with the apparatus (13/13'/13") being connected to the relay, the relay being connected to the interface, and the interface being connected to the collision warning devices (11/11'). This is considered herein as an indirect connection of the collision warning device to the solenoid valves within the actuation apparatus (13/13'/13"). It is intended that the claims be interpreted to cover the disclosed embodiment, those alternatives which have been discussed above and all equivalents thereto.

Additionally, as illustrated in FIG. 13, if desired, the driven vehicle may be equipped with both a forward collision avoidance system of any of versions (I), (II) and (IV) as well as the 360° collision avoidance system of version (II). In the exemplary installed configuration of this combined Forward Collision and 360° system illustrated in FIG. 13, the 360° configuration is the same as in FIG. 12 which shows a box indicating that up to four devices (11') may be used, with each device (11') including a plurality of proximity sensors and wherein one device (11') is for each of the front end, rear end, left side and right side of the vehicle. On the right side of FIG. 13, collision warning device (11) is shown with a long range obstacle sensor that will detect obstacles and calculate a closure time as discussed above. Both collision warning devices (11) and (11') will receive the necessary threshold information from the vehicle that allows automatic braking to be capable of being activated, i.e., the speed is within the required range and the brake pedal is not depressed, and any other pre-set factors (such as the turn signals being activated or not), with the collision warning device (11') being indirectly electrically connected to the solenoid valves of the actuation apparatus through an interface (14) and relay (12) as illustrated in FIG. 2, and the warning device (11) preferably being directly wired to the solenoid valves of the actuation apparatus (for example, by splicing wires together that connect the relay (12) to the solenoid valve(s) and connect the warning device (11) directly to the solenoid valve(s)). Since the two systems would require different speed conditions to be active, both cannot be active at the same time. The devices (11') will then trigger the actuation apparatus (13)/(13')/(13") (only one will be present; if 13", valves (11') could be wired (directly or indirectly) to only one solenoid valve, preferably to the solenoid valve with the largest output port diameter) to open the solenoid valves if any obstacles are detected within proximity of the vehicle when 360° system is active, and the device (11) will trigger the actuation apparatus (13)/(13')/(13") when forward collision avoidance is active (in the required speed range, as pre-programmed) and when an obstacle is within the pre-determined closure time signaling a threat of collision. The system again uses the existing pneumatic brakes of the vehicle, and with the driver always having the option of terminating or preventing the automatic braking by pressing the brake pedal (unless an optional override is installed and activated), and with optional automatic braking deactivation upon activating a turn signal if that feature is installed.

Finally, as an option for any of the collision avoidance systems (I), (II), (III) and (IV), the vehicle braking system may optionally be upgraded to include an electro-magnetic retarder device (not illustrated) mounted to a front and/or rear axle or to the drive shaft to augment vehicle braking. Such retarders are conventionally known frictionless stopping aids which are used to slow vehicles to prevent the service brakes from overheating and to minimize stopping distance, particularly when stopping a vehicle traveling at a high speed. Retarders are commercially available from such manufacturers as Frenelsa S.A., Telma, S.A., Cama Products, Kimbo/Sharp Corporation and others. Each version of the automatic braking systems may be further supplemented with optional features such as collision warning lights and/or other annunciators to aid in warning the vehicle driver of a potential collision or obstacle within the proximity of the driven vehicle, and these additional supplemental features may even be included as part of the commercially available collision warning device without affecting the basic and novel features of this disclosure.

It should be noted that the electrical wires (15, 15A, 15B, 15C, 15D, 15A', 15B', 15C', 15D', 15E/15F/15G) connecting the components as described above are the only non-pneumatic connections in the automatic braking systems of this disclosure. It should also be noted that none of braking system illustration FIGS. 1-4, 5A, 5B, and 6-7 are drawn exactly to scale.

The following elements are shown in the accompanying drawings:

11: Collision Warning Device (for detecting obstacles in front of the driven vehicle and calculating a closure time; first and third versions; FIG. 1 and FIG. 3)

11': Collision Warning Device (for detecting obstacles in proximity of the driven vehicle sides/ends; second version; FIG. 2)

12: Relay electrically connected to solenoid valve (AA) of apparatus (13) (FIG. 5B)

13: Actuation Apparatus (comprising a single solenoid operated valve; first and second versions; FIG. 1 and FIG. 2)

13': Actuation Apparatus (single stage; comprising four solenoid operated valves; FIG. 3)

13": Actuation Apparatus (multistage; comprising four solenoid operated valves; FIG. 4)

14: Interface/Relay switch electrically connected to relay (12) and collision warning device (11') (FIGS. 2 and 5B)

15, 15A, 15B, 15C, 15D, 15A', 15B', 15C', 15D': Wires connecting the collision warning device (11) to the solenoid operated valve of the actuation apparatus (13)/(13')/(13")

15E: Wire connecting the relay (12) to solenoid operated valve (AA) of the actuation apparatus (13) (FIGS. 2 and 5B)

15F: Wire connecting the relay (12) to interface/relay switch (14) (FIGS. 2 and 5B)

15G: Wire connecting the interface/relay switch (14) to the collision warning device(s) (11') (FIGS. 2 and 5B)

17: Front brake 2-way valve (first version; FIG. 1)

17A: Left front brake 2-way valve (third version; FIG. 3)

17B: Right front brake 2-way valve (third version; FIG. 3)

19: Pneumatic line connecting the solenoid operated valve of (13) to (17) (first version; FIG. 1)

19': Pneumatic line connecting t-connector (87) to (17) (fourth version; FIG. 4)

19A: Pneumatic line connecting solenoid operated valve A of (13') to (17A) (third version; FIG. 3)

19B: Pneumatic line connecting solenoid operated valve B of (13') to (17B) (third version; FIG. 3)

21: Brake pedal

23: Rear brake control valve

25: Front brake control valve

29: Second air pressure reservoir

31: Pneumatic line from $2^{nd}$ air pressure reservoir (29) to front brake control valve (25)

36: Front connector gate

37: Left front anti-lock braking system (ABS) control module

39: Right front anti-lock braking system (ABS) control module

40A: Pneumatic line connecting front connector gate (36) to left front anti-lock braking system (ABS) control module (37) (first and second versions; FIG. 1 and FIG. 2)

40A': Pneumatic line connecting front connector gate (36) to left front brake 2-way valve (17A) (third version; FIG. 3)

40B: Pneumatic line connecting front connector gate (36) to right front ABS control module (39) (first and second versions; FIG. 1 and FIG. 2)

40B': Pneumatic line connecting front connector gate (36) to right front brake 2-way valve (17B) (third version; FIG. 3)

40C: Pneumatic line connecting left front ABS control module (37) to left front brake assembly (41)

40D: Pneumatic line connecting right front ABS control module (39) to right front brake assembly (43)

40E: Pneumatic line connecting left front brake 2-way valve (17A) to left front ABS control module (37) (third version; FIG. 3)

40F: Pneumatic line connecting right front brake 2-way valve (17B) to right front ABS control module (39) (third version; FIG. 3)

41: Left front brake assembly

43: Right front brake assembly

44: Pneumatic line from first air pressure reservoir (45) to rear brake control valve (23)

45: First air pressure reservoir

49: Pneumatic line connecting the solenoid operated valve of (13) to (45)

51: Rear relay valve

51A: Rear 2-way valve (third version; FIG. 3)

51B: Rear 2-way valve (third version; FIG. 3)

52: Pneumatic line connecting front brake control valve (23) to rear relay valve (51)

53: Pneumatic line from rear relay valve (51) to left rear anti-lock braking system control module (55) (first and second versions; FIG. 1 and FIG. 2)

53': Pneumatic line from rear relay valve (51) to rear 2-way valve (51A) (third version; FIG. 3)

53A: Pneumatic line from rear left ABS module (55) to first left rear brake assembly (59A)

53B: Pneumatic line from rear left ABS module (55) to second left rear brake assembly (59B) (branching off from line (53A))

53C: Pneumatic line from rear 2-way valve (51A) to rear left ABS module (55) (third version; FIG. 3)

54: Pneumatic line from rear relay valve (51) to right rear anti-lock braking system control module (57) (first and second versions; FIG. 1 and FIG. 2)

54': Pneumatic line from rear relay valve (51) to rear 2-way valve (51B) (third version; FIG. 3)

54A: Pneumatic line from rear left ABS module (57) to first right rear brake assembly (61A)

54B: Pneumatic line from rear left ABS module (57) to second right rear brake assembly (61B) (branching off from line (54A))

54C: Pneumatic line from rear 2-way valve (51B) to rear right ABS module (57) (third version; FIG. 3)

55: Left rear anti-lock braking system control module

57: Right rear anti-lock braking system control module

59: Left rear brake unit

59A: First left rear brake assembly

59B: Second left rear brake assembly

61: Right rear brake unit

61A: First right rear brake assembly

61B: Second right rear brake assembly

63: Pneumatic line from rear brake 2-way valve (65) to rear relay valve (51) (first and second versions; FIG. 1 and FIG. 2)

65: Rear brake 2-way valve (first and second versions; FIG. 1 and FIG. 2)

67A: Rear relay valve input port

67B: Rear relay valve output port to trailer

70: Pneumatic line from rear relay valve (51) to the trailer protection valve (75)

71: Pneumatic line from rear brake control valve (23) to gate (73)

72: Pneumatic line from gate (73) to rear brake 2-way valve (65) (first and second versions; FIG. 1 and FIG. 2)

72': Pneumatic line from gate (73) to rear relay valve input port (67A) of valve (51) (third version; FIG. 3)

73: Connection gate between the rear brake control valve (23) and the rear brake 2-way valve (65)

75: Trailer protection valve
77: Representation of the trailer brake circuit
79: Pneumatic line connecting the solenoid operated valve of (13) to valve (65) (first and second versions; FIG. 1 and FIG. 2)
79': Pneumatic line connecting t-connector (87) to valve (65) (fourth version; FIG. 4)
79A: Pneumatic line connecting solenoid operated valve C of (13') to rear 2-way valve (51A) (third version; FIG. 3)
79B: Pneumatic line connecting solenoid operated valve D of (13') to rear brake 2-way valve (51B) (third version; FIG. 3)
81: Pneumatic line connecting the front brake control valve (25) and the front brake 2-way valve (17) (first version; FIG. 1)
81': Pneumatic line connecting the front brake control valve (25) and the front connector gate (36) (second and third versions; FIG. 2 and FIG. 3)
82: Exhaust air manifold (third version; FIGS. 3 and 6)
83: Pneumatic hose/connector linking the exhaust port of actuation apparatus (13') with exhaust air manifold (82) (third version; FIGS. 3 and 6)
84: Output air manifold (fourth version; FIGS. 4 and 7)
85: Pneumatic hose/connector linking the output port of actuation apparatus (13") with output air manifold (84) (fourth version; FIGS. 4 and 7)
86: Pneumatic line connecting the output port of actuation apparatus (13") to t-connector (87) (fourth version; FIG. 4)
87: T-connector connecting pneumatic lines (86), (19') and (79') (fourth version; FIG. 4)

What is claimed is:

1. An automatic braking system for a vehicle having pneumatic brakes, a vehicle brake pedal, a left turn signal, a left turn signal activator, a right turn signal and a right turn signal activator, the system comprising:
   a) an actuation apparatus comprising at least one solenoid operated pneumatic valve, wherein each of said at least one solenoid operated pneumatic valve comprises a solenoid, wherein each of said at least one solenoid operated pneumatic valve opens and remains open when the solenoid is energized, and closes and/or remains closed when the solenoid is not energized;
   b) a collision warning device directly or indirectly electrically connected to said at least one solenoid operated pneumatic valve, wherein the collision warning device continuously monitors the presence of obstacles in front of the vehicle and continuously calculates a closure time of the vehicle with a detected obstacle, wherein said collision warning device causes the solenoid of each of said at least one solenoid operated pneumatic valve to be energized when said closure time is at or below a pre-set time to collision value and causes the solenoid of each of said at least one solenoid operated pneumatic valve to remain energized until said closure time is above said pre-set time to collision value or until either the left turn signal is activated by the left turn signal activator or the right turn signal is activated by the right turn signal activator;
   c) a first air pressure reservoir pneumatically connected to said at least one solenoid operated pneumatic valve;
   d) front pneumatic brakes pneumatically connected to said at least one solenoid operated pneumatic valve, said front pneumatic brakes comprising a left front brake assembly and a right front brake assembly; and
   e) rear pneumatic brakes pneumatically connected to said at least one solenoid operated pneumatic valve, said rear pneumatic brakes comprising a left rear pneumatic brake unit and a right rear pneumatic brake unit, wherein each rear pneumatic brake unit comprises at least one pneumatic brake assembly;
   wherein opening the at least one solenoid operated pneumatic valve activates automatic braking, wherein when the at least one solenoid operated pneumatic valve is open, air flows from the first air pressure reservoir through the at least one solenoid operated pneumatic valve and then concurrently flows to all of the front pneumatic brake assemblies and rear pneumatic brake assemblies, thereby concurrently engaging the front pneumatic brake assemblies and engaging pneumatic brake assemblies of the rear pneumatic brake units, and wherein activating either the left turn signal or the right turn signal causes the solenoid of each open solenoid operated pneumatic valve to de-energize, thereby causing all of said open solenoid operated pneumatic valves to close, and thereby deactivating automatic braking.

2. The automatic braking system of claim 1 further comprising a left front anti-lock braking system control module pneumatically connected to the left front brake assembly and a right front anti-lock braking system control module pneumatically connected to the right front brake assembly, wherein said left front anti-lock braking system control module is pneumatically located between the actuation apparatus and the left front brake assembly, and wherein said right front anti-lock braking system control module is pneumatically located between the actuation apparatus and the right front brake assembly.

3. The automatic braking system of claim 2 wherein a front brake 2-way valve is pneumatically connected to the actuation apparatus and to each of the left front brake assembly and said right front brake assembly, wherein air is distributed to said left front brake assembly and said right front brake assembly by passing through a front connector gate, wherein said front brake 2-way valve is separately pneumatically connected to a front brake control valve and thereby allows air from the solenoid operated pneumatic valve to flow to the front pneumatic brake assemblies, and alternatively allows air from the front brake control valve to flow to the front pneumatic brake assemblies.

4. The automatic braking system of claim 1 wherein the left rear brake unit comprises at least two brake assemblies, and the right rear brake unit comprises at least two brake assemblies, and wherein the rear pneumatic brakes further comprise a left rear anti-lock braking system control module pneumatically connected to each brake assembly of the left rear brake unit and a right rear anti-lock braking system control module pneumatically connected to each brake assembly of the right rear brake unit, wherein said left rear anti-lock braking system control module is pneumatically located between the actuation apparatus and the left rear brake unit, and wherein said right rear anti-lock braking system control module is pneumatically located between the actuation apparatus and the right front brake unit.

5. The automatic braking system of claim 1 further comprising a rear brake 2-way valve pneumatically connected to said solenoid operated pneumatic valve and separately pneumatically connected to a rear brake control valve, and further comprising a rear relay valve pneumatically connected to said rear brake 2-way valve, said rear relay valve being separately pneumatically connected to each of said rear pneumatic brake units, wherein said rear brake 2-way valve allows air from the solenoid operated pneumatic valve to flow to the rear pneumatic brake units after said air first passes through the rear relay valve, or alternatively allows air from the rear brake control valve to flow to the rear pneumatic brake units after first passing through the rear relay valve.

6. The automatic braking system of claim 1 wherein said at least one solenoid operated pneumatic valve of said actuation apparatus is only one solenoid operated pneumatic valve.

7. The automatic braking system of claim 1 wherein said at least one solenoid operated pneumatic valve of said actuation apparatus comprises a plurality of solenoid operated pneumatic valves, wherein each of said plurality of solenoid operated pneumatic valves has at least one air output port, wherein all of said air output ports have different diameters, and wherein each of said plurality of solenoid operated pneumatic valves is energized at a different closure time value.

8. The automatic braking system of claim 7 wherein said at least one solenoid operated pneumatic valve of said actuation apparatus comprises a first solenoid operated pneumatic valve, a second solenoid operated pneumatic valve, a third solenoid operated pneumatic valve and a fourth solenoid operated pneumatic valve, wherein the diameter of the air output ports of said first solenoid operated pneumatic valve are smaller than the diameter of the air output ports of the second solenoid operated pneumatic valve; wherein the diameter of the air output ports of said second solenoid operated pneumatic valve are smaller than the diameter of the air output ports of the third solenoid operated pneumatic valve; and wherein the diameter of the air output ports of said third solenoid operated pneumatic valve are smaller than the diameter of the air output ports of the fourth solenoid operated pneumatic valve; and wherein the first solenoid operated pneumatic valve is energized at a greater closure time than the second solenoid operated pneumatic valve, wherein the second solenoid operated pneumatic valve is energized at a greater closure time than the third solenoid operated pneumatic valve, and wherein the third solenoid operated pneumatic valve is energized at a greater closure time than the fourth solenoid operated pneumatic valve.

9. The automatic braking system of claim 3 wherein said front brake control valve is pneumatically connected to said first air pressure reservoir.

10. The automatic braking system of claim 5 further comprising a connection gate pneumatically connected to both said rear brake control valve and said rear brake 2-way valve, wherein said connection gate is pneumatically located between said rear brake control valve and said rear brake 2-way valve.

11. The automatic braking system of claim 1 wherein the collision warning device continuously monitors the presence of obstacles in front of the vehicle and continuously calculates a closure time of the vehicle with a detected obstacle by transmitting and receiving radar signals, sonar signals, laser signals, or a combination thereof.

12. The automatic braking system of claim 1 wherein the collision warning device continuously monitors the presence of obstacles in front of the vehicle and continuously calculates a closure time of the vehicle with a detected obstacle by using a motion detecting, optical vision system.

13. The automatic braking system of claim 5 wherein when the vehicle brake pedal is pressed, all open solenoid operated pneumatic valves close and air from the rear brake control valve is passed through the rear brake 2-way valve and transported to the brake assemblies of the rear pneumatic brake units.

14. The automatic braking system of claim 1 wherein electrical functions of the vehicle are controlled by a Controller Area Network Bus (CAN Bus) protocol, wherein the collision warning device is electrically connected to and electrically communicates with said CAN Bus, and wherein the collision warning device is directly connected to the solenoid operated pneumatic valves.

15. The automatic braking system of claim 1 further comprising an electro-magnetic retarder mounted on a rear axle or on a drive shaft of the vehicle.

16. The automatic braking system of claim 6 wherein the solenoid operated pneumatic valve has a first output port pneumatically connected to the rear pneumatic brakes, a second output port pneumatically connected to the front pneumatic brakes, an input port pneumatically connected to said first air pressure reservoir, and an exhaust port.

17. The automatic braking system of claim 16 wherein each of said first outlet port and second outlet port has a diameter of about 3.0 mm or less.

18. The automatic braking system of claim 16 wherein each of said first outlet port and second outlet port has a diameter of from about 1.0 mm to about 2.5 mm.

19. The automatic braking system of claim 16 wherein each of said first outlet port and second outlet port have the same diameter.

20. An automatic braking system for a vehicle having pneumatic brakes, a vehicle brake pedal, a left turn signal, a left turn signal activator, a right turn signal and a right turn signal activator, the system comprising:
  a) an actuation apparatus comprising at least one solenoid operated pneumatic valve, wherein each of the at least one solenoid operated pneumatic valve comprises a solenoid, wherein said valve opens and remains open when the solenoid is energized, and closes and/or remains closed when the solenoid is not energized;
  b) one or more collision warning devices, each collision warning device being directly or indirectly electrically connected to each of said at least one solenoid operated pneumatic valve, and each collision warning device comprising one or more sensors that continuously monitor for the presence of obstacles in proximity of at least one side and/or end of the vehicle, wherein each collision warning device causes the solenoid of said solenoid operated pneumatic valve to be energized when an obstacle is detected in proximity of at least one side and/or end of the vehicle and causes the solenoid to remain energized until said obstacle is no longer detected or until either the left turn signal is activated by the left turn signal activator or the right turn signal is activated by the right turn signal activator;
  c) a first air pressure reservoir pneumatically connected to said solenoid operated pneumatic valve;
  d) front pneumatic brakes pneumatically connected to said at least one solenoid operated pneumatic valve, said front pneumatic brakes comprising a left front brake assembly and a right front brake assembly; and
  e) rear pneumatic brakes pneumatically connected to said at least one solenoid operated pneumatic valve, said rear pneumatic brakes comprising a left rear pneumatic brake unit and a right rear pneumatic brake unit, wherein each pneumatic brake unit comprises at least one pneumatic brake assembly;
    wherein opening said at least one solenoid operated pneumatic valve activates automatic braking, wherein when said at least one solenoid operated pneumatic valve is open, air flows from the first air pressure reservoir through said at least one solenoid operated pneumatic valve and then concurrently flows to each of the rear pneumatic brake assemblies and optionally to each of the front pneumatic brake assemblies, thereby engaging the pneumatic brake assemblies of the rear pneumatic brake units and optionally engaging the front pneumatic brake assemblies concurrently with the rear pneumatic brake assemblies, and optionally wherein activating either the left turn signal or the right turn signal causes the solenoid of each open solenoid operated pneumatic valve to de-energize, thereby causing all of said open solenoid operated pneumatic valves to close, and thereby deactivating automatic braking.

21. The automatic braking system of claim 20 wherein activating either of said left turn signal or said right turn signal causes deactivation of the automatic braking system and wherein pressing the vehicle brake pedal causes deactivation of the automatic braking system.

22. A method of automatic braking of a moving vehicle that has pneumatic brakes, a vehicle brake pedal, a left turn signal, a left turn signal activator, a right turn signal and a right turn signal activator, the method comprising the steps of:
   a) monitoring for the presence of obstacles that are either:
      (i) in proximity of at least one side and/or end of the vehicle; or
      (ii) within a pre-set time to collision value in front of the vehicle;
   b) activating automatic braking when an object is either:
      (i) detected in proximity of at least one side and/or end of the vehicle; or
      (ii) detected within said pre-set time to collision value in front of the vehicle;
   wherein automatic braking is activated by energizing at least one solenoid operated pneumatic valve which opens each of said energized solenoid operated pneumatic valves and initiates flow of air from an air pressure reservoir through each of said open solenoid operated pneumatic valves, wherein said air then flows concurrently to each of a front left pneumatic brake assembly, a front right pneumatic brake assembly, to rear left brake assemblies that form a rear left pneumatic brake unit and to rear right brake assemblies that form a pneumatic brake unit, thereby causing the concurrent engaging of all of said brakes assemblies; and optionally wherein activating either the left turn signal with the left turn signal activator or the right turn signal with the right turn signal activator causes the solenoid of each of said open solenoid operated pneumatic valves to de-energize, thereby causing all of said open solenoid operated pneumatic valves to close, and thereby deactivating automatic braking.

23. An automatic braking system for a vehicle having pneumatic brakes, which vehicle has a vehicle brake pedal, a left turn signal, a left turn signal activator, a right turn signal, a right turn signal activator and a plurality of wheels, each of said wheels being connected to a brake assembly and each of said wheels having a wheel sensor connected to the brake assembly of said wheel, the system comprising:

a) an actuation apparatus comprising a plurality of solenoid operated pneumatic valves, wherein each of said solenoid operated pneumatic valves comprises a solenoid and wherein each of said solenoid operated pneumatic valves open and remain open when its solenoid is energized and closes and/or remains closed when its solenoid is not energized, wherein each solenoid operated pneumatic valve is pneumatically paired with an anti-lock braking system control module;

b) a collision warning device electrically connected said solenoid operated pneumatic valves of the actuation apparatus, wherein the collision warning device continuously monitors the presence of obstacles in front of the vehicle and continuously calculates a closure time of the vehicle with a detected obstacle, wherein said collision warning device causes the concurrent energizing of the solenoid of each solenoid operated pneumatic valve when said closure time is at or below a pre-set time to collision value, and causes each solenoid to remain independently energized unless any of the following conditions i) or ii) or iii) occurs:
   i) said closure time increases to a value above said pre-set time to collision value, thereby de-energizing all of the solenoids of all of said at least one solenoid operated pneumatic valves, thereby causing all of said at least one solenoid operated pneumatic valves to concurrently close, thereby deactivating all automatic braking; or
   ii) at least one of said wheel sensors detects that the brake assembly it is connected to has locked, thereby de-energizing the solenoid of said at least one solenoid operated pneumatic valve that is connected to the locked brake assembly independently of the other wheels, thereby closing said at least one solenoid operated pneumatic valve connected to the locked brake assembly, thereby deactivating automatic braking for the locked brake assembly; or
   iii) either the left turn signal is activated by the left turn signal activator or the right turn signal is activated by the right turn signal activator;

c) a first air pressure reservoir pneumatically connected to each solenoid operated pneumatic valve; and
   wherein opening each of said at least one solenoid operated pneumatic valves activates automatic braking, wherein when any of said at least one solenoid operated pneumatic valves is open, air flows from the first air pressure reservoir concurrently through each solenoid operated pneumatic valve and then concurrently flows toward all brake assemblies, thereby causing the concurrent engaging of all of said brake assemblies, wherein activating either the left turn signal or the right turn signal causes the solenoid of each open solenoid operated pneumatic valve to concurrently de-energize, thereby causing each of said open solenoid operated pneumatic valves to concurrently close, and thereby deactivating all automatic braking.

* * * * *